(12) United States Patent
Haddadin et al.

(10) Patent No.: US 10,678,210 B2
(45) Date of Patent: Jun. 9, 2020

(54) CONTROLLING AND/OR REGULATING MOTORS OF A ROBOT

(71) Applicant: Kastanienbaum GmbH, München (DE)

(72) Inventors: Sami Haddadin, Hannover (DE); Nico Mansfeld, München (DE)

(73) Assignee: Kastanienbaum GmbH, München (DE)

( * ) Notice: Subject to any disclaimer, the term of this patent is extended or adjusted under 35 U.S.C. 154(b) by 231 days.

(21) Appl. No.: 15/568,169

(22) PCT Filed: Apr. 22, 2016

(86) PCT No.: PCT/EP2016/059062
§ 371 (c)(1),
(2) Date: Oct. 20, 2017

(87) PCT Pub. No.: WO2016/170144
PCT Pub. Date: Oct. 27, 2016

(65) Prior Publication Data
US 2018/0081340 A1   Mar. 22, 2018

(30) Foreign Application Priority Data
Apr. 22, 2015 (DE) .................. 10 2015 106 227

(51) Int. Cl.
*B25J 9/16*    (2006.01)
*G05B 19/4061*    (2006.01)

(52) U.S. Cl.
CPC ........ *G05B 19/4061* (2013.01); *B25J 9/1666* (2013.01); *B25J 9/1671* (2013.01);
(Continued)

(58) Field of Classification Search
CPC ...... G05B 19/4061; G05B 2219/40492; G05B 2219/39097; G05B 2219/40516;
(Continued)

(56) References Cited

U.S. PATENT DOCUMENTS 6,216,058 B1 * 4/2001 Hosek .................... B25J 9/1664
318/568.21
8,700,307 B1 * 4/2014 Zhao ...................... B25J 9/1666
701/301

(Continued)

FOREIGN PATENT DOCUMENTS

DE   10 2010 018 440 A1   12/2010
DE   10 2010 018 438 A1   1/2011
(Continued)

OTHER PUBLICATIONS

Falconi, Riccardo; PCT/EP2016/059062; International Search Report; ISA/EP; dated Sep. 23, 2016.
(Continued)

*Primary Examiner* — Jason Holloway
(74) *Attorney, Agent, or Firm* — Nexsen Pruet, LLC; Todd A. Serbin

(57) ABSTRACT

The invention relates to a method and device for controlling and regulating motors, $MOT_m$, of a robot, with m=1, 2, ... M, wherein the robot has robot components that are interconnected via a number, N, of articulated connections $GEL_n$, the joint angles of the articulated connections $GEL_n$ can be adjusted by means of associated motors $MOT_m$; $Z(t_k)$ is a state of the robot components in an interval, $t_k$; and a first system of coupled motion equations BGG is predetermined and describes rigid-body dynamics or flexible-body dynamics of the connected robot components.

20 Claims, 3 Drawing Sheets

(52) U.S. Cl.
CPC ... *B25J 9/1676* (2013.01); *G05B 2219/39091* (2013.01); *G05B 2219/39097* (2013.01); *G05B 2219/40492* (2013.01); *G05B 2219/40512* (2013.01); *G05B 2219/40515* (2013.01); *G05B 2219/40516* (2013.01)

(58) Field of Classification Search
CPC ........... G05B 2219/40515; G05B 2219/40512; G05B 2219/39091; B25J 9/1676; B25J 9/1671; B25J 9/1666
See application file for complete search history.

(56) References Cited

U.S. PATENT DOCUMENTS

| | | | | |
|---|---|---|---|---|
| 9,031,691 | B2* | 5/2015 | Yamane | B25J 9/1602 700/245 |
| 2007/0255454 | A1 | 11/2007 | Dariush | |
| 2009/0074979 | A1* | 3/2009 | Krogedal | G05B 19/404 427/427.2 |
| 2011/0106309 | A1* | 5/2011 | Lim | B62D 57/032 700/250 |

FOREIGN PATENT DOCUMENTS

| | | |
|---|---|---|
| DE | 10 2014 104 220 A1 | 10/2014 |
| DE | 10 2014 104 226 A1 | 10/2014 |
| DE | 10 2013 010 290 A1 | 12/2014 |
| JP | 2011167827 A | 9/2011 |
| WO | 2009/055707 A1 | 4/2009 |
| WO | 2009055707 A1 | 4/2009 |

OTHER PUBLICATIONS

Liebschner, Mario; German Examination Report; DE 10 2015 106 227.5; dated Sep. 22, 2015.

Mansfeld, Nico et al; "Reaching Desired States Time-Optimally from Equilibrium and Vice Versa for Visco-Elastic Joint Robots with Limited Elastic Deflection"; IEEE/RSJ International Conference on Intellectual Robots and Systems; Sep. 14, 2014; pp. 3904-3911.

Vannoy, John et al; Real-Time Adaptive Motion Planning (RAMP) of Mobile Manipulators in Dynamic Environments with Unforeseen Changes; IEEE Transactions on Robotics; Oct. 2008; pp. 1199-1212; vol. 24; No. 5.

De Luca, Alessandro; "Decoupling and Feedback Linearization of Robots with Mixed Rigid/Elastic Joints"; IEEE International Conference on Robotics and Automation; Apr. 1996; pp. 816-821; vol. 1.

De Luca, Alessandro et al; "Collision Detection and Safe Reaction with the DLR-III Lightweight Manipulator Arm"; IEEE; 8 pages.

Khatib, Oussama; "Inertial Properties in Robotic Manipulation: An Object-Level Framework"; International Journal of Robotics Research; Feb. 1995; pp. 1-37; vol. 14; No. 1.

Haddadin, Sami et al; "On Making Robots Understand Safety: Embedding Injury Knowledge into Control"; pp. 1-22.

Täubig, Holger et al; "A New Library for Real-Time Continuous Collision Detection"; Robotik; 2012; pp. 108-112.

Gilbert, Elmer G. et al; "A Fast Procedure for Computing the Distance Between Complex Objects in Three-Dimensional Space"; IEEE Journal of Robotics and Automation; Apr. 1988; pp. 193-203; vol. 4, No. 2.

Office Action (and English Traslation) issued in parallel Japanese case Dec. 28, 2018.

Article entitled: Reaching Desired States Time-Optimally From Equilibrium and Vice Versa for Visco-Elastic Joint Robots With Limited Elastic Deflection by Nico Mansfeld and Sami Haddadin, in 2014 IEEE/RSJ International Conference on Intelligent Robots and Systems Sep. 14-18, 2014 Sep. 14, 2014.

Article entitled: Real-Time Adaptive Motion Planning (RAMP) of Mobile Manipulators in Dynamic Environments With Unforeseen Changes by John Vannoy and Jing Xiao, in IEEE Transactions on Robotics, Oct. 5, 2008 Oct. 5, 2008.

* cited by examiner

CONTROLLING AND/OR REGULATING MOTORS OF A ROBOT

RELATED APPLICATIONS

This application is a U.S. national phase application, claiming priority under 35 U.S.C. 371 to PCT application PCT/EP2016/059062, filed on Apr. 22, 2016, claiming priority to German national application 10 2015 106 227.5, filed on Apr. 22, 2015, the contents of the these applications incorporated by reference as if fully set forth herein in their entirety.

FIELD AND BACKGROUND OF INVENTION

The invention relates to a method for controlling and/or regulating motors of a robot, wherein the robot has robot components that are interconnected via a number N of articulated connections $GEL_n$. Furthermore, the invention relates to a device for controlling and/or regulating motors of such a robot, a robot with such a controlling or regulating device, a computer system, a digital storage medium, a computer program product, and a computer program.

Related attempts to solve problems in the field include (citations to these references within the text, below, correspond to the following numbering):

[1] E. G. Gilbert, D. W. Johnson und S. S. Keerthi, "*A fast procedure for computing the distance between complex objects in three-dimensional space*," IEEE Journal of Robotics and Automation, vol. 4, no. 2, pp. 193-203, 1998.

[2] U. Frese und H. Taubig: "*A new library for real-time continuous collision detection*," Proceedings of 7th German Conference on Robotics (ROBOTIK2012), pp. 1-5, VDE, 2012.

[3] S. Haddadin, S. Haddadin, A. Khoury, T. Rokahr, S. Parusel, R. Burgkart, A. Bicchi, und A. Albu-Schaffer, "*On making robots understand safety: Embedding injury knowledge into control*," International Journal of Robotics, 2012.

[4] O. Khatib, "*Inertial properties in robotic manipulation: an object-level framework*," Int. Journal of Robotics Research, vol. 14, no. 1, pp. 19-36, 1995.

[5] A. De Luca, A. Albu-Schaffer, S. Haddadin, und G. Hirzinger, "*Collision detection and safe reaction with the DLR-III lightweight manipulator arm*," in IEEE/RSJ Int. Conf, on Intelligent Robots and Systems (IROS2006), Beijing, China, 2006, pp. 1623-1630.

DESCRIPTION OF SPECIFIC EMBODIMENTS OF THE INVENTION

Figure 1:
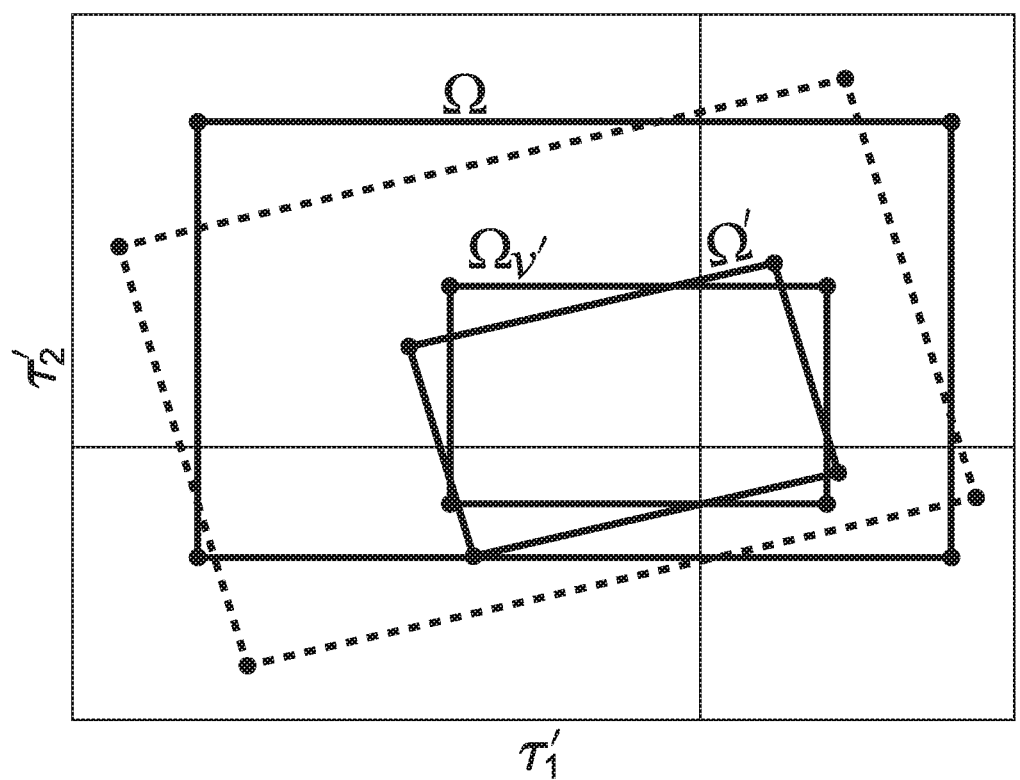
FIG. 1 shows a representation of a control range with independent limiting values in the decoupled space by scaling of the original motor torque.

The connected robot components preferably form a robot manipulator. The term "robot manipulator" is understood to be a device of a robot which enables the physical interaction of the robot with the surroundings: The robot manipulator is a movable part of the robot which carries out mechanical work of the robot, and thus can interact mechanically with its surroundings. The robot manipulator is typically configured as a robot arm which has a plurality of manipulator components (arm components) which are connected in an articulated manner by means of articulated connections. The individual articulated connections are adjustable by actuators, so that the robot arm can change its shape and its position and situation in space (relative to the (rest of the) robot). Moreover, the robot manipulator has, typically at its free end, an effector which carries out the actual mechanical interaction with the surroundings of the robot. For this purpose, the effector preferably comprises grippers and/or tools for mechanical interaction with objects.

The articulated connections which are adjustable by actuators or motors can be designed to be rigid or can have a defined intrinsic resilience, so that in the latter case the robot manipulator overall has defined resilient properties. In particular the control/regulation of robot manipulators with resilient joints has become the focus of more intense interest in the last two decades. On the one hand, this is because of the higher demand in the industry for speed and load capacity of robots; even with oversized drives designed to be as rigid as possible, resilient deformations and dynamic interactions have a considerable influence on the motion. On the other hand, the intensified interest is because in more and more robots resilience is deliberately employed in order, for example, to simplify an interaction with people through the passive flexibility of the robot, or in order to simulate the dynamics of the biological locomotor system, and in order to use possibilities for storing potential energy.

The object of the present invention is to provide an improved method for controlling/regulating motors of a robot, wherein the motors control articulated connections which connect robot components, wherein application of the method necessitates a low computing capacity, and thus can be used for real-time control and regulation of the (drive) motors of the robot.

The invention is disclosed by the features of the independent claims. Preferred modifications and embodiments are the subject matter of the dependent claims. Further features, possible applications and advantages of the invention are disclosed by the following description as well as the explanation of exemplary embodiments of the invention, which are illustrated in the drawings.

Based on the preceding statements, as a first aspect of the invention a method for controlling and regulating motors $MOT_m$ of a robot, with m=1, 2, ... M, is proposed, wherein the robot has robot components that are interconnected via a number N of articulated connections $GEL_n$, with n=1, 2, ..., N; wherein the joint angles of the articulated connections $GEL_n$ can be adjusted by means of associated motors $MOT_m$; wherein $Z(t_k) = \{z_p(t_k)\}$ is a state of the robot components in an interval $t_k$, wherein k=0, 1, 2, 3, ... and p=1, 2, ..., P; wherein a first system of coupled motion equations $BG_G$ is predetermined and describes rigid-body dynamics or flexible-body dynamics of the robot manipulator, wherein in the first system of motion equations $BG_G$, $u_m(t_k)$ is a manipulated variable for the respective motor $MOT_m$, and wherein for the first system of coupled motion equations $BG_G$, restrictions of the manipulated variables $u_m(t_k)$ and restrictions of the states $Z(t_k)$ of the connected robot components are predetermined.

The articulated connections $GEL_n$ can have a defined intrinsic resilience, which is described by the flexible-body dynamics. They can also be designed to be rigid, which is described by a rigid-body dynamics. The robot components can be arranged in series and/or in parallel. The articulated connections $GEL_n$ can, for example, be simple joints or coupling joints. An articulated connection $GEL_n$ can have one or more hinge axes about which the articulated connection is adjustable. One or more motors $MOT_m$ for adjustment of the plurality of joint axes can be associated with a multi-axially adjustable articulated connection $GEL_n$. Preferably N=M and n=m, which means that each articulated connection is adjustable around or along an axis, and in each case one motor per articulated connection is present for adjustment.

The term "motor" should be interpreted broadly here. In the broadest sense it covers all controllable actuators, in particular electric motors, stepping motors, linear motors, but also piezoelectric elements, etc., which enable corresponding positioning/axial angle setting of articulated connections $GEL_n$ of the robot components.

The robot components are arranged serially in a preferred embodiment and form, for example, a robot manipulator. In this case the robot components are assumed to be rigid, which is sufficiently close to reality in the majority of cases.

The expression "state Z(t)" designates in particular a mechanical/dynamic state of the robot components, the articulated connections $GEL_n$ and/or the motors $MOT_m$, for example, with some or all of the following time-dependent variables $Z_p(t_k)$:

- position, speed, acceleration of the articulated connections,
- actuating angle, actuating angle speed, actuating angle acceleration of the respective articulated connection $GEL_n$.
- position, velocity, acceleration of the respective motor $MOT_m$;
- position, situation, change of position, speed of change of the position of the robot components in space.

The dimension of the state Z(t) is P.

In this case the term "manipulated variable" $u_m(t)$ indicates the nominal value of the respective reference variable and is an input variable for the corresponding control path in the case of regulation or input variable for the corresponding actuator (i.e. in this case the motors $MOT_m$) in the case of control. The manipulated variable can be, for example, an electrical power, an electrical voltage, an electrical current intensity, or the motor torque.

Restrictions of manipulated variables $u_m(t)$ and restrictions of the state Z(t) or the state variables $Z_p(t)$ defining this state can be, for example, given as relations to predetermined limiting values, for example, $G1<u_m(t)<G2$, or $d(u_m(t))/dt<G3$.

The proposed method according to the first aspect comprises the following steps.

In one step, for the first system of coupled motion equations $BG_G$, a second system of locally equivalent decoupled motion equations $BG_E$ is provided that describes the rigid-body dynamics or the flexible-body dynamics of the connected robot components. The system of decoupled motion equations $BG_E$ is advantageously determined by a double diagonalization of the coupled motion equations $BG_G$ or by solving of the generalized eigenvalue problem of the coupled motion equations $BG_G$.

A further step provides restrictions of the manipulated variables $u_m(t_k)$ transformed into the second system and provides restrictions of the states $Z(t_k)$ transformed into the second system. The coupled motion equations $BG_G$ and the decoupled motion equations $BG_E$ can be transferred by corresponding transformations into one another.

In a further step, the state $Z(t_k)$ transformed into the second system as $Z^*(t_k)$ is provided.

In a further step, for the second system of decoupled motion equations $BG_E$, setting a target state $SZ^*$ of the robot manipulator which is to be reached starting from the state $Z^*(tk)$ takes place, and setting (104) one or more conditions $BD^*$ and/or one or more characteristics $KZ^*$ that define how to achieve the target state $SZ^*$ takes place. The target state $SZ^*$ is set in the second system of decoupled motion equations $BG_E$, preferably as $SZ^*=\{z_p^*\}$ with p=1, 2, . . . , P.

In a further step, in the second system of decoupled motion equations $BG_E$ a state trajectory $ZT^*(t)$ and the associated manipulated variable trajectories $uT^*_m(t)$ are predicted depending on the state $Z^*(t_k)$ and the target state $SZ^*$ while meeting the conditions $BD^*$, the characteristics $KZ^*$, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval. The prediction interval is preferably selected in such a way that the target state $SZ^*$ is achieved within the prediction interval.

In a further step transforming of the manipulated variable trajectories $uT^*_m(t)$ and the state trajectories $ZT^*(t)$ into the first system of coupled motion equations $BG_G$ takes place to generate manipulated variable trajectories $uT_m^{}(t)$ and state trajectories $ZT^{}(t)$, In a further step, from the manipulated variable trajectories $uT_m^{**}(t)$ determination of manipulated variables $u_m(t_{k+1})$ for the next interval k+1 and regulating of the motors $MOT_m$ by means of the manipulated variables $u_m(t_{k+1})$ takes place.

In a further step, from the state trajectories $ZT^{**}(t)$ and/or on the basis of sensor data of a detection system of the state Z(t), determining of the state $Z(t_{k+1})$ takes place for the interval k+1.

In a further step, for $Z(t_k)=Z(t_{k+1})$, the method is performed again until a predetermined break-off criterion or the target state SZ in the first system of coupled motion equations $BG_G$ is reached. The target state SZ is produced, for example, through transformation of the target state $SZ^*$ into the first system of coupled motion equations $BG_G$ or it is predetermined correspondingly for the system of coupled motion equations $BG_G$.

Alternatively, as a second aspect of the invention a method a method for controlling and regulating motors $MOT_m$ of a robot, with m=1, 2, . . . M, is proposed, wherein the robot has robot components that are interconnected via a number N of articulated connections $GEL_n$, with n=1, 2, . . . , N; joint angles of the articulated connections $GEL_n$ can be adjusted by means of associated motors $MOT_m$; $Z(t_k)=\{z_p(t_k)\}$ is a state of the robot components in an interval $t_k$, wherein k=0, 1, 2, 3, . . . and p=1, 2, . . . , P; a first system of coupled motion equations $BG_G$ is predetermined and describes rigid-body dynamics or flexible-body dynamics of the robot manipulator; in the first system of motion equations $BG_G$ $u_m(t_k)$ is a manipulated variable for the respective motor $MOT_m$, and for the first system of coupled motion equations $BG_G$, restrictions of the manipulated variables $u_m(t_k)$ and restrictions of the states $Z(t_k)$ of the connected robot components are predetermined.

The method according to the second aspect comprises the following steps. In one step, for the first system of coupled motion equations $BG_G$, a second system of locally equivalent decoupled motion equations $BG_E$ is provided that describes the rigid-body dynamics or the flexible-body dynamics of the connected robot components, and a regulating and/or control law RG is provided for the manipulated variables $u_m(t_k)$. A further step provides restrictions of the manipulated variables $u_m(t_k)$ transformed into the second system and provides restrictions of the states $Z(t_k)$ transformed into the second system, and provides the regulating and/or control law RG transformed into the second system as RG*: A further step provides the state $Z(t_k)$ transformed into the second system as $Z^*(t_k)$.

In a further step, for the second system of decoupled motion equations $BG_E$, setting takes place of one or more conditions BD and/or one or more characteristics KZ that define the framework in which the regulating and/or control law RG should be applied. In a further step, in the second system of decoupled motion equations $BG_E$ a state trajectory $ZT^*(t)$ and the associated manipulated variable trajectories $uT^*_m(t)$ are predicted depending on the state $Z^*(t_k)$ and the target state SZ* on the basis of the regulating and/or control law RG transformed into the second system while meeting the transformed restrictions of the manipulated variables $u_m(t_k)$, the conditions BD*, the characteristics KZ*, and the transformed restrictions of the states $Z(t_k)$ with at least an accuracy of <20% for an interval of $t=t_k$ to $t=t_{k+w}$, wherein $\Delta t=t_{k+w}-t_k$ with W>k is a predetermined prediction interval. In a further step transforming of the manipulated variable trajectories $uT^*_m(t)$ and the state trajectories $ZT^*(t)$ into the first system of coupled motion equations $BG_G$ takes place to generate manipulated variable trajectories $uT_m^{}(t)$ and state trajectories $ZT^{}(t)$. In a further step, from the manipulated variable trajectories $uT_m^{}(t)$ determination of manipulated variables $u_m(t_{k+1})$ for the next interval k+1 and regulating of the motors $MOT_m$ by means of the manipulated variables $u_m(t_{k+1})$ takes place. In a further step, from the state trajectories $ZT^{}(t)$ and/or on the basis of sensor data of a detection system of the state $Z(t)$, determining of the state $Z(t_{k+1})$ takes place for the interval k+1. In a further step, for $Z(t_k)=Z(t_{k+1})$, the method is performed again until a predetermined break-off criterion is reached.

The method according to the second feature differs from the method according to the first feature in that instead of a target state SZ* a control and regulating law is predetermined which is applied with reference to predetermined conditions BD* or characteristics KZ*. In both variants of the method the following preferably applies: N=M and n=m. The two methods proposed above enable a simple, computing time saving and sufficiently accurate control/regulation of the motor $MOT_m$ which saves on computing time and is sufficiently precise. The method is preferably carried out automatically.

The N-dimensional system of coupled motion equations $BG_G$ can advantageously be represented by the following equations:

$$B\ddot{\theta}=\tau_m-\tau_f-\tau_J \quad (30)$$

$$M(q)\ddot{q}=\tau_g+\tau_{ext}-\tau_J \quad (31)$$

$$\tau_J=K_J(\theta-q)+D_J(\dot{\theta}-\dot{q}) \quad (32)$$

with
$\theta$: position vector of the motors $MOT_m$
q: position vector of the articulated connections $GEL_n$
B: inertia of the motors $MOT_m$
M(q): configuration-dependent inertia matrix of the connected robot components
$K_J$: rigidity matrix of the articulated connections $GEL_n$
$D_J$: rigidity matrix of the articulated connections $GEL_n$
$\tau_m$: torque of the motors $MOT_m$ $\tau_f$: friction of the motors $MOT_m$
$\tau_g$: gravitational torques
$\tau_{ext}$: external torques, Coriolis torques
t: time The coupling of the motion equations results from the configuration-dependent inertia matrix M(q) of the robot manipulator.

In order to simplify the foregoing system of equations, the influence of gravity and of Coriolis torques and other external torques is advantageously set to be equal to zero ($\tau_g=\tau_{ext}=0$). In most cases this is possible without major disadvantages with regard to precision, and enables a reduction of the computing costs and thus an improved real-time regulation/control.

In a preferred further embodiment, the restrictions of state variables $\{z_p(t_k)\}$ of the connected robot components in the system of coupled motion equations $BG_G$ are predetermined as follows:

$$|\varphi|=|\theta-q|\leq\varphi_{max}, \text{ and} \quad (34)$$

$$|\dot{\theta}|\leq\dot{\theta}_{max}. \quad (35)$$

$$|\tau_m|\leq\tau_{max} \quad (36)$$

Thus the magnitude of the spring deflection $|\varphi|$ of the joints $GEL_n$, the magnitude of the speeds $|\dot{\theta}|$ of the motors $MOT_m$, and the magnitude of the motor torques $|\tau_m|$ are limited by correspondingly predetermined limiting values $\varphi_{max}$, $\dot{\theta}_{max}$, $\tau_{max}$.

The following statements relate to the method according to the first aspect of the invention.

In a preferred further embodiment, the target state SZ* predetermined for the second system or the target state $SZ=(SZ^*)^T$ transformed into the first system is predetermined in a time-variable manner: SZ=SZ(t) and $SZ^*=SZ^*(t)$. The target state SZ(t) or $SZ^*(t)$ which the connected robot components should adopt in the context of the predetermined conditions BD* and/or characteristics KZ* is preferably determined depending upon obstacles in the surroundings of the robot which are recognized by a surroundings sensor system. As a result, the robot can be controlled in such a way that a collision with obstacles can be prevented in a time-variable environment.

An advantageous condition BD* is that the target state SZ* is reached in minimal time, and/or that the target state SZ* is reached with a minimal energy requirement of the motors $MOT_m$, and/or that the target state SZ* is reached with a minimal braking distance of the joint angles of the articulated connections $GEL_n$, and/or that the target state SZ* is reached with a minimal braking distance of all the connected robot components, and/or that the target state SZ* is reached without falling short of a minimum spacing of the connected robot components from an object present in the surroundings of the robot.

Advantageously an initial state $Z^*(t_k)$ is a rest state of the robot components, in which a joint angular speed of all articulated connections $GEL_n$ is equal to zero, and the target state SZ* is a predetermined motion state of the robot components, wherein the target state SZ* should be reached in a minimal time.

A particularly preferred further embodiment is characterized in that an initial state $Z^*(t_k)$ is a motion state of the connected robot components, the target state SZ* is a rest state of the robot components in which a joint angular speed of all articulated connections $GEL_n$ is equal to zero, and the target state SZ* should be reached in a minimal time. This scenario corresponds to a braking operation of the connected robot components out of a motion state into a rest state in minimal time. The braking operation could also lead to a target state SZ* of all connected robot components which is not a rest state, but still has only a minimal residual state, on account of which no damage is to be expected in the event of a collision with an object, in particular with a person. Furthermore, the target state SZ* could be a deflection movement contrary to a predicted direction of collision with a recognized object.

A braking distance BW* of each of the robot components is preferably predicted on the basis of the initial state $Z^*(t_k)$ and the target state SZ*.

In a preferred further embodiment, the target state SZ is a state in which the connected robot components are motionless. In this case the current state $Z(t_k)$ is preferably a motion state for which, for example, the following applies: $\dot{q}(t)=\dot{q}_a$ and $\dot{\theta}(t)=\dot{\theta}_a$, and the target state SZ is the rest state, for which the following applies: $\dot{q}(t+\Delta t=0)$ and $\dot{\theta}(t+\Delta t)=0$, wherein $\dot{q}_a$ and $\dot{\theta}_a$ are predetermined values, and $\Delta t$ is a predetermined time (for example, the minimal time) for reaching the target state SZ. Thus, the control/regulation task consists of braking the robot manipulator out of a moving state into a rest state, in a predetermined or in particular the minimal time $\Delta t$. The solution to this task can protect a robot (robot manipulator), for example, against collisions with briefly occurring objects.

Naturally, the method can also be used for control/regulation of the motors $MOT_m$ in the case in which the current state $Z(t_k)$ is a rest state, for which the following applies: $\dot{q}(t)=0$ and $\dot{\theta}(t)=0$, and the target state SZ is a motion state, for which the following applies: $\dot{q}(t+\Delta t)=\dot{q}_d$ and $\dot{\theta}(t+\Delta t)=\overline{\theta}_d$, wherein $\dot{q}_d$ and $\dot{\theta}_d$ are predetermined values, and $\Delta t$ is a predetermined time or in particular a minimal time for reaching the target state SZ.

A further embodiment of the proposed method is characterized in that in the system of decoupled motion equations $BG_E$ for each articulated connection $GEL_n$ a forward trajectory $VT_i$ (braking trajectory) of a future movement of the robot manipulator is determined and provided. This forward trajectory $VT_i$ comprises predicted positions of the articulated connection $GEL_n$. A braking distance $\Delta q_i = q_i(t+\Delta t) - q_i(t)$ is advantageously determined on the basis of the forward trajectory VTi for each articulated connection $GEL_n$. The shape or positioning of the robot manipulator in the achieved rest state can be determined, for example, from the braking distance.

A further variant of the method is characterized in that the manipulated variables $u_m^*(t)$ in the second system of decoupled motion equations $BG_E$ depending upon the determined forward trajectory VTi and/or the braking distances $\Delta q_i$. This enables, for example, to determine the manipulated variables $u_i^*(t)$ under the condition of predetermined braking distances, in particular minimal braking distances $\Delta q_i$.

A further variant of the method is characterized in that the space spanned by motor torques of the motors $MOT_m$ can be described by a hypersquare $\Omega$, of which the transformation into the system of decoupled motion equations $BG_E$ produces a hypersquare $\Omega_v$, wherein in the system of decoupled motion equations $BG_E$ based upon the hypersquare $\Omega_v$ a greatest possible hypersquare $\Omega_v'$ is determined, for which it is the case that a back transformation of the hypersquare $\Omega_v'$ into the system of coupled motion equations $BG_G$ is located completely inside the borders of the hypersquare $\Omega$, wherein the determination of the manipulated variable $u_m^*(t)$ takes place only on the hypersquare $\Omega_v'$. The same applies analogously for motor speed or motor acceleration as manipulated variables.

A further aspect of the invention relates to a computer system, with a data processing device, wherein the data processing is configured in such a way that a method as described above is carried out on the data processing device.

A further aspect of the invention relates to a digital storage medium with electronically readable control signals, wherein the control signals can interact with a programmable computer system, so that a method as described above is carried out.

A further aspect of the invention relates to a computer program product with program code stored on a machine-readable support for carrying out the method as described above, when the program code is executed on a data processing device.

A further aspect of the invention relates to a computer program product with program codes for carrying out the method as described above, when the program runs on a data processing device. For this purpose, the data processing device can be configured as any computer system known from the prior art.

A further aspect of the invention relates to a method for controlling and regulating motors $MOT_m$ of a robot, with m=1, 2, ... M, wherein the robot has robot components that are interconnected via a number N of articulated connections $GEL_n$, with n=1, 2, ..., N; joint angles of the articulated connections $GEL_n$ can be adjusted by means of associated motors $MOT_m$; $Z(t_k)=\{z_p(t_k)\}$ is a state of the robot components in an interval $t_k$, wherein k=0, 1, 2, 3, ... and p=1, 2, ..., P; a first system of coupled motion equations $BG_G$ is predetermined and describes rigid-body dynamics or flexible-body dynamics of the robot manipulator; in the first system of motion equations $BG_G$ $u_m(t_k)$ is a manipulated variable for the respective motor $MOT_m$; and for the first system of coupled motion equations $BG_G$, restrictions of the manipulated variables $u_m(t_k)$ and restrictions of the states $Z(t_k)$ of the connected robot components are predetermined. The device comprises a means by which, for the first system of coupled motion equations $BG_G$, a second system of locally equivalent decoupled motion equations BGE is provided that describes the rigid-body dynamics or the flexible-body dynamics of the connected robot components; a means by which restrictions of the manipulated variables $u_m(t_k)$ transformed into the second system and restrictions of the states $Z(t_k)$ transformed into the second system are provided; a predetermining means by which the state $Z(t_k)$ transformed into the second system as $Z^*(t_k)$ is provided; a means by which, for the second system of decoupled motion equations $BG_E$, setting of a target state SZ* of the robot manipulator which is to be reached starting from the state $Z^*(t_k)$ takes place, and setting of one or more conditions BD* and/or one or more characteristics KZ* that define how to achieve the target state SZ* takes place; a means by which, in the second system of decoupled motion equations $BG_E$ a state trajectory ZT*(t) and the associated manipulated variable trajectories $uT^*_m(t)$ are predicted depending on the state $Z^*(t_k)$ and the target state SZ* while meeting the conditions BD*, the characteristics KZ*, the transformed restrictions of the manipulated variables $u_m(t_k)$, and the transformed restrictions of the states $Z(t_k)$ for an interval of $t=t_k$ to $t=t_{k+w}$, wherein $\Delta t = t_{k+w} - t_k$ is a predetermined prediction interval; a means by which, transforming of the manipulated variable trajectories $uT^*_m(t)$ and the state trajectories ZT*(t) into the first system of coupled motion equations $BG_G$ takes place to generate manipulated variable trajectories $uT_m^{}(t)$ and state trajectories $ZT^{}(t)$, a means by which, from the manipulated variable trajectories $uT_m^{}(t)$ determination of manipulated variables $u_m(t_{k+1})$ for the next interval k+1 and regulating of the motors $MOT_m$ by means of the manipulated variables $u_m(t_{k+1})$ takes place, a means (208) by which, from the state trajectories $ZT^{}(t)$ and/or on the basis of sensor data of a detection system of the state $Z(t)$, determining of the state $Z(t_{k+1})$ takes place for the interval k+1; and a means which is connected to the predetermination means and passes a $Z(t_k)$ to the predetermination means, for which $Z(t_k)=Z(t_{k+1})$ applies until a predetermined break-off criterion or the target state SZ/SZ* is reached.

A further aspect of the invention relates to a device for controlling and regulating motors $MOT_m$ of a robot, with m=1, 2, . . . M, wherein the robot has robot components that are interconnected via a number N of articulated connections $GEL_n$, with n=1, 2, . . . , N; joint angles of the articulated connections $GEL_n$ can be adjusted by means of associated motors $MOT_m$; $Z(t_k)=\{z_p(t_k)\}$ is a state of the robot components in an interval $t_k$, wherein k=0, 1, 2, 3, . . . and p=1, 2, . . . , P; a first system of coupled motion equations $BG_G$ is predetermined and describes rigid-body dynamics or flexible-body dynamics of the robot manipulator; in the first system of motion equations $BG_G$ $u_m(t_k)$ is a manipulated variable for the respective motor $MOT_m$; and for the first system of coupled motion equations $BG_G$, restrictions of the manipulated variables $u_m(t_k)$ and restrictions of the states $Z(t_k)$ of the connected robot components are predetermined, comprising a means by which, for the first system of coupled motion equations $BG_G$, a second system of locally equivalent decoupled motion equations $BGE$ is provided that describes the rigid-body dynamics or the flexible-body dynamics of the connected robot components, and a regulating and/or control law RG for the manipulated variables $u_m(t_k)$ is provided; a means by which restrictions of the manipulated variables $u_m(t_k)$ transformed into the second system, restrictions of the states $Z(t_k)$ transformed into the second system, and a regulating and/or control law transformed into the second system as RG* are provided; a predetermining means by which the state $Z(t_k)$ transformed into the second system as $Z^*(t_k)$ is provided; a means by which, for the second system of decoupled motion equations $BG_E$, one or more conditions BD* and/or one or more characteristics KZ* that define how to achieve the target state SZ* are provided; a means by which, in the second system of decoupled motion equations $BG_E$ a state trajectory $ZT^*(t)$ and the associated manipulated variable trajectories $uT^*_m(t)$ are predicted depending on the state $Z^*(t_k)$ and the target state SZ* on the basis of the regulating and/or control law RG transformed into the second system while meeting the transformed restrictions of the manipulated variables $u_m(t_k)$, and the transformed restrictions of the states $Z(t_k)$ are predicted with at least an accuracy of <20% for an interval of $t=t_k$ to $t=t_{k+w}$, wherein $\Delta t=t_{k+w}-t_k$ with W>k is a predetermined prediction interval; a means by which transforming of the manipulated variable trajectories $uT^*_m(t)$ and the state trajectories $ZT^*(t)$ into the first system of coupled motion equations $BG_G$ takes place to generate manipulated variable trajectories $uT_m^{}(t)$ and state trajectories $ZT^{}(t)$, a means by which, from the manipulated variable trajectories $uT_m^{}(t)$ manipulated variables $u_m(t_{k+1})$ are determined for the next interval k+1 and the motors $MOT_m$ are regulated by means of the manipulated variables $u_m(t_{k+1})$; a means by which, from the state trajectories $ZT^{}(t)$ and/or on the basis of sensor data of a detection system of the state $Z(t)$, the state $Z(t_{k+1})$ is determined for the interval k+1; and a means which is connected to the predetermination means and passes a $Z(t_k)$ to the predetermination means, for which $Z(t_k)=Z(t_{k+1})$ applies until a predetermined break-off criterion is reached.

The specified means of the proposed devices can be configured as a computer which at least comprises: a processor which performs the stated calculations or the control/regulation tasks, an input interface (keyboard, mouse, internet, WLAN, Bluetooth etc.), an output interface (monitor, printer, loudspeaker, etc.) and a storage unit (hard disk/CD/SIM card, etc.).

Lastly, a further aspect of the invention relates to a robot with a device as described above.

The following statements explain the idea underlying the invention in greater detail using the specific example of a control/regulation of a robot manipulator, the joints of which can be adjusted by motors.

In order to ensure the safety of persons located in the surroundings of the robot and/or of the robot, it is necessary in many situations to brake a robot manipulator. A partial aspect relates to a method for estimating a braking trajectory (i.e. a braking distance prediction) of the robot manipulator starting from a current state of the robot manipulator. The estimation includes a final standstill position of the robot manipulator, the standstill time associated therewith as well as the complete progression over time of the joint angle/robot position (kinematics) and dynamics from the start of the braking operation until the robot manipulator is at a standstill. When the braking trajectory is determined, the following questions inter alia can be answered:

How great is the distance between one or more points of the robot manipulator from one or more point(s), objects/obstacles in the surroundings of the robot?

What properties do the parts of the robot manipulator have (for example location, speed and mass of the respective part), in the event of a collision of the robot, for example, with a person?

How great is the risk potential for the robot or a person in the event of a collision?

For parts of the robot manipulator are there breaches of predetermined limiting values, for example joint positions and/or joint speeds or fault conditions in the braking operation?

Which of a plurality of available brake regulators best meets a specific criterion, such as, for example, a predetermined braking distance, a predetermined collision avoidance or compliance with limiting values?

With the aid of the answers to these questions the following (re)actions are possible inter alia:

Preventing collisions, by initiating a braking operation of the robot manipulator, so long as the estimation does not foresee any collision.

Permitting collisions of the robot manipulator while ensuring the safety of the robot/a person by initiating the braking operation when the braking distance prediction predicts no danger for the robot/the person.

Selecting one of a plurality of potentially available brake regulators, regulation parameters and parameters of the braking trajectory.

Afterwards in this connection two models are proposed which can advantageously be used to describe a dynamics of the robot manipulator.

The first model describes the dynamics of a robot manipulator with rigid articulated connections. In this case the robot manipulator is described as an open kinematic chain with rigid bodies and n rotational articulated connections $GEL_n$. The dynamics of the robot manipulator with rigid articulated connections $GEL_n$ is given in the first model by the following differential equation:

$$M(q)\ddot{q}+C(q,\dot{q})\dot{q}+g(q)=\tau+\tau_f+\tau_{ext} \quad (1)$$

wherein the generalized coordinates $q \in R^n$ are the positions of the n articulated connections $GEL_n$. $M(q) \in R^{n \times n}$ is the symmetrical and positively defined mass matrix; $C(q,\dot{q}) \in R^{n \times n}$ the Coriolis and centrifugal forces; and $g(q) \in R^n$ the gravity vector. $t \in R^n$ is the motor torque; $\tau_f \in R^n$ the motor friction torque; and $\tau_{ext} \in R^n$ the external torque. It is assumed that $\tau_f = \tau_{ext} = 0$ applies. The motor torque, the motor speeds and the positions of each joint i are typically limited as follows:

$$|\tau_i| \leq \tau_{max,i} \quad (2)$$

$$|\dot{q}_i| \leq \dot{q}_{max,i} \quad (3)$$

$$|\ddot{q}_i| \leq \ddot{q}_{max,i} \quad (4)$$

with: i=1, ..., n.

Other restrictions are possible. The positions $q_i$ can also be unrestricted.

The following second model describes a robot manipulator with resilient articulated connections $GEL_n$. For robot manipulators that have definitely intrinsically resilient articulated connections have, the starting point is the following dynamics:

$$M(q)\ddot{q}+C(q,\dot{q})\dot{q}+g(q)=\tau_J+\tau_{ext} \quad (5)$$

$$B\ddot{\theta}+\tau_J=\tau+\tau_f \quad (6)$$

$$\tau_J=K_J(\theta-q)=K_J(\varphi) \quad (7)$$

In this case $\theta \in R^n$ is the motor position, $q \in R^n$ the output position, $\tau_J \in R^n$ the elastic torque, $K_J = \text{diag}\{k_{J,i}\} \in R^{n \times n}$ the diagonal, positive definite rigidity matrix and $B = \text{diag}\{b_i\} \in R^{n \times n}$ the diagonal, positive definite motor mass matrix. In this case the following limiting values are typically taken into consideration:

$$|\tau_i| \leq \tau_{max,i} \quad (2)$$

$$|\theta_i| \leq \theta_{max,i} \quad (8)$$

$$|\dot{\theta}_i| \leq \dot{\theta}_{max,i} \quad (9)$$

$$|\varphi_i| \leq \varphi_{max,i} \quad (10)$$

with i=1, ..., n. In this connection $\varphi=\theta-q$ is the deflection of the articulated connection. In this robot model the motor dynamics is linear, i.e. the motor and output dynamics are only coupled by means of the resilient torque. The output dynamics in the second model has the same properties as the robot manipulator with rigid joints.

The initial and end conditions for braking a robot manipulator are:

$$q(0)=q_0, q(t_f)=\text{free, or } q(t_f)=q_d(t_f) \quad (12)$$

$$\dot{q}(0)=\dot{q}_0, \dot{q}(t_f)=0 \quad (13)$$

$$\ddot{q}(0)=\ddot{q}_0, \ddot{q}(t_f)=0 \quad (14)$$

where $q(0)$, $\dot{q}(0)$ and $\ddot{q}(0)$ are the initial position, speed and acceleration of the output. At the end time $t_f$ the speed and acceleration are zero, whereas the position is either undefined or is a specific target position. In addition to (12)-(14), the following boundary conditions apply for robot manipulators with resilient joints:

$$\theta(0)=\theta_0, \theta(t_f)=K_J^{-1}g(q(t_f))+q(t_f) \quad (15)$$

$$\dot{\theta}(0)=\dot{\theta}_0, \dot{\theta}(t_f)=0 \quad (16)$$

$$\ddot{\theta}(0)=\ddot{\theta}_0, \ddot{\theta}(t_f)=0 \quad (17)$$

Similarly to the output, the motor acceleration and motor speed must be zero in order to achieve a standstill. In equilibrium the elastic torque in the joint must compensate for the gravitational torque, i.e. $\tau_J(t_f)=g(q(t_f))$. This results in a static deviation between the motor position and the output position.

In order to satisfy the conditions (12) to (17), different brake regulators can be used. As a rule these have the objective of meeting a specific predetermined criterion. Thus, the braking can take place inter alia optimally in terms of energy or time, and alternatively attempts can be made to brake along a desired trajectory. One or more brake regulators may be available for the braking.

Furthermore, the boundary conditions for the braking of a robot manipulator are explained, and possible brake regulators are presented which can satisfy these conditions.

The estimation of the braking trajectory of the robot manipulator (braking distance prediction) consists of determining the trajectory of the robot manipulator from the starting state $\theta(0)$, $\dot{\theta}(0)$, $\ddot{\theta}(0)$, $q(0)$, $\dot{q}(0)$, $\ddot{q}(0)$ to a standstill $\dot{\theta}(t_f)=\dot{q}(t_f)=0$, $\ddot{\theta}(t_f)=\ddot{q}(t_f)=0$ including the dynamics of the robot manipulator and of the regulator. The estimated final time is designated by $\hat{t}_f$.

In order to calculate the braking trajectory, the entire dynamics of the robot manipulator [equation (1) for robots with rigid joints or equations (5)-(7) for robots with resilient joints] can be simulated forwards. This usually requires considerable computing power and cannot be achieved in real time at high regulator scanning rates.

However, it is possible to simplify the computation by making assumptions about the dynamic system behavior. Since gravitational and Coriolis torques are usually compensated for by the robot control, for the sake of simplification they can be excluded from the computation. Thus, for robot manipulators with rigid joints (rigid kinematics), for example, only the change to the mass matrix $M(q)$ can be considered. Furthermore, for the sake of simplification it can be assumed that the dynamics hardly changes during the braking operation and thus can be regarded as constant. These simplifications lead to an impairment of the precision of prediction of the braking trajectory, but the prediction can be calculated more quickly and, if need be, can be implemented in real time.

A simulation of the dynamics from the starting state to a standstill supplies the estimated progression of the joint positions $\hat{q}_b(t) \in R^n$ and joint speeds $\hat{\dot{q}}_b(t) \in R^n$, where $t \in [t_0, t_f]$ applies. By eigendecomposition of the system dynamics it is possible to describe the braking trajectory not only in the joint space but also in modal coordinates.

Furthermore if, for example, a relevant point, designated as POI (point of interest), on the robot manipulator is considered, it is possible with the aid of the forward kinematics of the robot manipulator also to determine the progression over time of the Cartesian position $\hat{x}_{b,POI}(t) \in R^3$ and speed $\hat{\dot{x}}_{b,POI}(t) \in R^3$ of this POI. Cartesian, joint and modal coordinates can always be transferred into one another by transformation.

In order to actively influence the braking distance of the robot manipulator, for example in order to avoid collisions, the braking trajectory is advantageously also calculated (estimated) when the robot manipulator behaves nominally (for example, follows a desired trajectory), no error state occurs, and there has been no request from the user for stopping or the actual braking operation has not yet been initiated. When the estimation of the braking distance is calculated regularly, with reference to different criteria that are described below the braking can be automatically initiated and/or modifications to the brake regulator or to the desired braking trajectory can be carried out.

After the braking trajectory has been calculated, starting from the initial state of the robot manipulator, this trajectory can be used advantageously for further analyses and provisions of the robot control.

For example, an object (article/obstacle/person/etc.) in a working space of the robot manipulator may be represented by a number $X_{obs}$ of Cartesian points. Naturally, other coordinate systems can also be used. The distance of the aforementioned POIs of the robot manipulator from an object/obstacle can be determined with the aid of the function $d=\text{min\_dist}(x_{POI}, x_{obs})$, wherein min_dist for example can be obtained with the GJK algorithm [1] or the Kinematic Continuous Collision Detection Library [2]. Naturally, a plurality of POIs and a plurality of objects/obstacles can also be taken into consideration.

If the braking trajectory is known, the smallest distance from the object can be determined during the braking operation, namely: $\hat{d}_{min}=\min(\text{min\_dist}(x_{POI}(t), X_{obs}))$, $t \in [t_0, t_f]$. The smallest possible distance does not necessarily have to occur when the robot manipulator comes to a standstill, but can be present along the braking trajectory. If $\hat{d}_{min}>0$ applies, then the robot manipulator probably will not collide with the object, whereas for the case $\hat{d}_{min} \leq 0$ a contact is very likely.

During the braking operation it can happen that predetermined restrictions BD* (characteristic values KW*), such as, for example, the maximum position or speed of an articulated connection $GEL_n$, are breached. As a rule it is undesirable for limiting values to be exceeded, since this leads to damage to the robot lead and/or can impair the braking operation. With the aid of the estimated braking trajectory it is possible to examine the progression of the joint/motor positions and speeds proactively for instances of limiting values being exceeded. For robot manipulators with rigid articulated connections, values are exceeded when the following applies:

$$|\hat{q}_{b,i}(t)| \geq q_{max,i} \quad (18)$$

$$|\hat{\dot{q}}_{b,i}(t)| \geq \dot{q}_{max,i}, \quad (19)$$

wherein $t \in [t_0, \hat{t}_f]$ and $i=1, \ldots, n$. For robot manipulators with resilient articulated connections, there is a breach of limiting values when the following applies:

$$|\hat{\theta}_{b,i}(t)| \geq \theta_{max,i} \quad (20)$$

$$|\hat{\dot{\theta}}_{b,i}(t)| \geq \dot{\theta}_{max,i} \quad (21)$$

$$|\hat{\varphi}_{b,i}(t)| \geq \varphi_{max,i} \quad (22)$$

Thus, with the aid of the braking distance prediction it is possible to determine at what time and to what extent limiting values are exceeded.

When the braking distance prediction foresees a collision, for example, with a person, i.e. $\hat{d}_{min} \leq 0$, the probability of injury to the person and/or the probability of damage to the robot can be determined with suitable collision models or other representations/indices that assign collision parameters to injury/damage.

If a plurality of brake regulators are available for braking of the robot manipulator, it is possible to predicted which brake regulator best meets a specific predetermined criterion. For this purpose, the braking trajectory must be calculated for each brake regulator. For example, it is possible to analyze which method leads most quickly to stopping of the robot manipulator or can maintain the smallest distance from the surroundings during braking.

Thus, with the aid of the braking distance prediction it is possible to determine the minimum distance of the robot manipulator from an obstacle/object during the braking operation. This knowledge can be used to initiate the braking so that no possibly dangerous collision occurs or at least the danger emanating from the robot manipulator is minimized.

In order to avoid contact, the braking operation must be initiated so long as $\hat{d}_{min}>0$ applies. If the estimated distance is less than or equal to zero, the robot manipulator will probably collide with the obstacle/object. The robot control can initiate the braking automatically as soon as the minimum estimated distance falls below a limiting value $\varepsilon$, i.e. $\hat{d}_{min} < \varepsilon$ applies.

If the result of the calculation of the braking trajectory is that predetermined limiting values are breached, the regulation parameters, the regulator type or a desired braking trajectory can be modified in order to achieve better compliance with the limiting values. If changes have been made, the braking trajectory must be estimated again. This procedure can be repeated successively until all the limiting values are complied with. In many cases, however, the initial conditions during initiation of the braking operation are such that with limited control variables it is not possible to avoid exceeding limiting values. Advantageously, during planning of the robot trajectory it is ensured are that the robot can be braked at any time.

Using the estimation of a severe injury to a person and/or of damage to the robot manipulator, the braking operation can be initiated in such a way that a contact occurs ($\hat{d}_{min} \leq 0$), but a specific degree of severity of the injury/damage is not exceeded.

The following example serves for further explanation of the above statements. In this example the braking of a robot manipulator is treated with the dynamics (1) and limiting values (2)-(4). Robot manipulators with resilient joints and corresponding dynamics (5)-(7) are not considered, since the basic procedure is the same as for robot manipulators with rigid joints.

The aim is to bring the robot manipulator to a standstill as quickly as possible. In this case it is assumed that a person stays in the working space of the robot manipulator without moving. The position as well as the outline of the person are detected, for example, by a 3D scanner or a 3D camera system and are provided for the control of the robot manipulator. In order to determine the distance between the robot manipulator and the person, only a POI of the robot manipulator is considered.

During design of the regulator it is assumed that the motor torques are limited according to (2). A part of the maximum torque is applied to compensate for gravity. The configuration-dependent limits are:

$$\tau'_{m,i}(q):=-(\tau_{max,i}+g_i(q))<0 \quad (24)$$

$$\tau'_{M,i}(q):=\tau_{max,i}+g_i(q)>0 \quad (25)$$

The remaining component of the available torque $\tau'=\tau-g(q)$ satisfies the condition:

$$\tau'_{m,i}(q) \leq \tau'_i \leq \tau'_{M,i}(q), i=1, \ldots, n. \quad (26)$$

Two brake regulators are proposed below. A brake regulator that is designed in joint coordinates q [5] and a brake regulator that is designed in modal co-ordinates.

The change to the kinetic energy of a robot manipulator over time is: $\dot{T}=\dot{q}\tau'$. The following regulator law leads locally to the greatest possible reduction of T:

$$\tau_i = \begin{cases} \tau'_{m,i}(q) \text{ if } \dot{q}_i \geq 0 \\ \tau'_{M,i}(q) \text{ if } \dot{q}_i < 0 \end{cases} + g_i(q) \qquad (27)$$

with i=1, . . . , n. In order to achieve a compromise between an optimal solution and a uniform achievement of the target state $\dot{q}(t_f)=0$, $\ddot{q}(t_f)=0$, a transition region $2\varepsilon_i$ can be introduced, such as takes place in (28).

$$\tau_i = \begin{cases} \tau'_{m,i}(q) \text{ if } \dot{q}_i \geq 0 \\ \tau'_{m,i}(q)\dot{q}_i/\varepsilon_i \text{ if } \varepsilon_i > \dot{q}_i \geq 0 \\ \tau'_{M,i}(q)\dot{q}_i/\varepsilon_i \text{ if } -\varepsilon_i < \dot{q}_i \leq 0 \\ \tau'_{M,i}(q) \text{ if } \dot{q}_i \geq \varepsilon_i \dot{q}_i \leq -\varepsilon_i \end{cases} + g_i(q) \qquad (28)$$

For the sake of simplicity only the regulator law (27) is considered below. Since Coriolis torques are present, the effective torque is the one that accelerates the mass of the robot manipulator:

$$\tilde{\tau} = \tau - g(q) - C(q,\dot{q})\dot{q}. \qquad (29)$$

If the locally optimal brake regulator is used, the following is obtained:

$$\tilde{\tau}_i = -\text{sign}(\dot{q}_i)\tau_{max,i} - g_i(q) - \{C(q,\dot{q})\dot{q}\}_i \qquad (30)$$

with i=1, . . . , n.
With the aid of (29) the dynamics of the robot manipulator (1) can be formulated as follows:

$$M(q)\ddot{q} = \tilde{\tau} \qquad (31)$$

By solution of the generalized eigenvalue problem (31) can be transformed into a decoupled space. Because of the symmetrical, positively definite mass matrix M(q) an orthonormal matrix $V \in R^{n \times n}$ can be found, so that the following correlation applies:

$$MV = VM_V \qquad (32)$$

In this case $M_V = \text{diag}\{m_{V,i}\} i=1, \ldots, n$ is a diagonal matrix that contains the system eigenvalue. By the use of V the output positions, speeds and accelerations as well as the effective torque can be transformed into modal coordinates.

$$q_V = V^T q \qquad (33)$$

$$\dot{q}_V = V^T \dot{q} \qquad (34)$$

$$\ddot{q}_V = V^T \ddot{q} \qquad (35)$$

$$\tilde{\tau}_V = V^T \tilde{\tau} \qquad (36)$$

As a result, n double integrators that are independent of one another are obtained $$m_{V,i} \ddot{q}_{V,i} = \tilde{\tau}_{V,i}, i=1, \ldots, n \qquad (37)$$

In order to convert the regulator law (27) into modal coordinates, the control limits, i.e. the motor torques, are likewise transformed into the decoupled space. The space that is spanned by the motor torque can be described by the hypersquare $$\Omega := [\tau'_{m,1}, \tau'_{M,1}] \times \ldots \times [\tau'_{m,n}, \tau'_{M,n}]$$

with the corresponding key points $v_i = [v_i(1), \ldots, v_i(n)]^T, i=1, \ldots, 2n$, see FIG. 1. The transformed limits are defined as $$\Omega_V := V^T(\Omega)$$

which means that each section of $\Omega$ is transformed. The transformation is linear, for $\det[\Omega]^T = 1$ the hypersquare is rotated about the origin, whereas for $\det[\Omega]^T = -1$ a mirroring takes place.

After the motor torques have been transformed into the decoupled space, the maximum and minimum values of each articulated connection or modal coordinates are no longer independent of one another. This behavior can be reproduced with reference to the rectangle with sides shown by broken lines in FIG. 1. In this example a manipulator with two drives can be considered, for example a double pendulum. Consequently, it may be observed that the decoupling of the dynamics leads to a coupling of the motor torques. It would be possible to formulate an optimal control problem, in which the coupling of the motor torques is taken into consideration. However, the objective here is to maintain the decoupling of the system. Therefore, a hypersquare $\Omega'_V$ is sought, in which each modal coordinate has independent minimum and maximum values. A condition for this hypersquare $\Omega'_V$ is that this must lie completely within the original limits $\Omega$ if it is back transformed into the original space ($\Omega'$).

It is possible to find the greatest possible hypersquare $\Omega'_V$. The ratio of minimum and maximum manipulated variable of each articulated connection should also be obtained here in modal coordinates, and for this reason the original torques are scaled uniformly, see FIG. 1.

The required scaling factor k can be determined with the aid of the algorithm set out below. The maximum and minimum joint torques are $\tau'_M := [\tau'_{M,i}, \ldots, \tau'_{M,n}]^T$ and $\tau'_m := [\tau'_{m,i}, \ldots, \tau'_{m,n}]^T$.

Algorithm 1:

$k \leftarrow 1$
for i = 1 to $2^n$ do
$\quad v_{i,V} \leftarrow V v_i$
$\quad d_i \leftarrow |v_{i,\bar{V}}| - |v_i|$
$\quad j \leftarrow \arg\max d_i(j)$
$\quad$ if $|v_{i,\bar{V}}(j)| > |v_i(j)|$ then
$\quad\quad k \leftarrow \min\left\{k, \dfrac{v_i(j)}{v_{i,\bar{V}}(j)}\right\}$
$\quad$ end if
end for
$\tau'_{V,M} \leftarrow k\tau'_M$
$\tau'_{V,m} \leftarrow k\tau'_m$ The limiting values of the control input in the decoupled space are now $$\tau'_{V,m} \leq \tau'_{V,i} \leq \tau'_{V,M} \qquad (40)$$

Similarly to (27), the regulator law for braking of each modal coordinate states $$\tau'_{V,i} = \begin{cases} \tau'_{V,m,i} \text{ if } \dot{q}_{V,i} \geq 0 \\ \tau'_{V,M,i} \text{ if } \dot{q}_{V,i} < 0 \end{cases} \qquad (41)$$

with i=1, . . . , n. Ultimately the control input in the joint space can be obtained by back transformation with V:

$$\tau = V\tau'_V + g(q). \qquad (42)$$

With regard to the required braking duration the brake regulator (42) is less efficient than the brake regulator (27), since the available motor torques must be reduced in order to implement the decoupling of dynamics and control range.

Subsequently the decoupling-based brake regulator (42) is used in order to brake the robot. The calculation (estimation) of the braking trajectory now follows. First of all, the prediction of the braking trajectory using the decoupling-based regulator is considered. Next it is described how these results can be used if the joint-based brake regulator (27) is employed.

It is assumed that Coriolis torques are negligible or have been compensated for exactly. Furthermore, since the joint angles q only change a little during the braking operation, it is assumed, that the mass matrix is constant. The dynamics in modal co-ordinates is given by:

$$m_{V,i}\ddot{q}_{V,i} = \tau'_{V,i}, i=1,\ldots,n. \tag{43}$$

The braking of a double integrator only requires one motor cycle, i.e. the motor does not have to reverse the torque. By solution of the dynamics (43) for a constant control input the following is obtained:

$$\hat{q}_{V,i}(t) = q_{V,0,i} + \dot{q}_{V,0,i} + \frac{1}{2}\frac{\tau'_{V,i}}{m_{V,i}}t^2 \tag{44}$$

$$\hat{\dot{q}}_{V,i}(t) = \dot{q}_{V,0,i} + \frac{\tau'_{V,i}}{m_{V,i}}t \tag{45}$$

with i=1, . . . , n. If $\hat{\dot{q}}_{V,i}(t)=0$ is set and this equation is solved with respect to time, the final time and associated end position are obtained:

$$\hat{t}_{f,i} = -m_{V,i}\frac{\dot{q}_{V,0,i}}{\tau'_{V,i}}t_0 \tag{46}$$

$$\hat{q}_{V,i}(\hat{t}_{f,i}) = q_{V,0,i} - \frac{1}{2}\frac{m_{V,i}\dot{q}_{V,0,i}^2}{\tau'_{V,i}} \tag{47}$$

If a modal coordinate has reached a standstill, $\tau'_{V,i}(t > \hat{t}_{f,i}) = 0$ must be selected and consequently the following is obtained:

$$\hat{q}_{V,i}(t > \hat{t}_{f,i}) = \hat{q}_{V,i}(\hat{t}_{f,i}) \tag{48}$$

$$\hat{\dot{q}}(t > \hat{t}_{f,i}) = 0 \tag{49}$$

The braking duration of the entire robot manipulator is generally the greatest final time of all co-ordinates:

$$\hat{t}_f = \max(\hat{t}_{f,i}), i=1,\ldots,n \tag{50}$$

With the aid of the estimated braking duration and (44)-(45) it is now possible to determine a discretized braking trajectory. The time vector $t_b$ that consists of $n_b$ support points is defined for this purpose.

$$t_{b,0} = t_0 \tag{51}$$

$$t_{b,j+1} = t_{b,j} + \frac{\hat{t}_f}{n-1}, j=1,\ldots,n_b-1 \tag{52}$$

The decoupled positions and speeds (44) and (45) can now be determined for each time $t_{b,j}$. The entire braking trajectory can be represented by the following matrices.

$$\hat{Q}_{bV} = \begin{bmatrix} \hat{q}_{bV,1,1} & \cdots & \hat{q}_{bV,1,n_b} \\ \vdots & \ddots & \vdots \\ \hat{q}_{bV,n,1} & \cdots & \hat{q}_{bV,n,n_b} \end{bmatrix} = [\hat{q}_{bV,1},\ldots,\hat{q}_{bV,n_b}] \tag{53}$$

$$\hat{\dot{Q}}_{bV} = \begin{bmatrix} \hat{\dot{q}}_{bV,1,1} & \cdots & \hat{\dot{q}}_{bV,1,n_b} \\ \vdots & \ddots & \vdots \\ \hat{\dot{q}}_{bV,n,1} & \cdots & \hat{\dot{q}}_{bV,n,n_b} \end{bmatrix} = [\hat{\dot{q}}_{bV,1},\ldots,\hat{\dot{q}}_{bV,n_b}] \tag{54}$$

The braking trajectory in the joint space can be obtained by the back transformation by means of V.

$$\hat{Q}_b = [\hat{q}_{bV,1},\ldots,\hat{q}_{bV,n_b}] = [V\hat{q}_{bV,1},\ldots,V\hat{q}_{bV,n_b}] \tag{55}$$

$$\hat{\dot{Q}}_b = [\hat{\dot{q}}_{bV,1},\ldots,\hat{\dot{q}}_{bV,n_b}] = [V\hat{\dot{q}}_{bV,1},\ldots,V\hat{\dot{q}}_{bV,n_b}] \tag{56}$$

A discretization of the braking trajectory does not necessarily have to take place. For the analyses, for example, optimization processes are employed that use (44) and (45) directly.

If the joint-based regulator (27) is used in order to brake the robot manipulator, the braking distance prediction can be calculated as follows. Advantageously, in order to carry out a real-time capable computation the following simplifications are performed:

since the joint angles q only change slightly during the braking, M(q)=const and g(q)=const are assumed.

furthermore, it is assumed that the Coriolis torques are constant or are compensated for exactly by the control.

It is possible to solve the system dynamics in the joint space, from the starting state to the standstill, in order to obtain the braking trajectory. Furthermore, it is possible to determine the braking trajectory in the decoupled space (32)-(37). When calculating the modal positions and speeds attention must be paid to the plus/minus sign of $\tau'_{V,i}$. Whereas in the decoupling-based regulator (42) the plus/minus sign of the torque remains the same until the standstill, the plus/minus sign of the torque in the joint space can change during the braking operation because of the coupling of the system dynamics. Therefore, changes of plus/minus sign of $\dot{q}$ and $\tau$ must be detected and must be included in (33)-(37) and (44)-(45).

For the sake of simplicity, only a POI of the robot manipulator to which a Cartesian position $x_{POI}$ is assigned is considered. The stationary person is represented by a number of points $X_h$. Using the forward kinematics of the robot manipulator and the estimated braking trajectory (55), the progression the POI position $\hat{x}_{POI,j}$ over time can be specified, as well as the distance $\hat{d}_j=\text{min\_dist}(x_{POI,j},X_h)$, j=1, . . . , $n_b$ of the robot manipulator from the person. The smallest possible estimated distance is $\hat{d}_{min}=\min(\hat{d})$. Instead of evaluating the discretized braking trajectory, alternative optimization methods (for example, gradient methods) can be used, in order to determine the minimum distance in a shorter computing time.

In order to are determine whether a speed or positioning limit is exceeded, it is necessary to examine whether (3) and (4) complied with during the braking operation. Since the decoupling approach has been chosen for the brake regulator and the braking distance prediction, the modal positions and speeds are transformed into the joint space. In vector notation (44) and (45) are:

$$\hat{q}_V(t) = q_{V,0} + \dot{q}_{V,0}t + \tfrac{1}{2}b_v t^2 \tag{57}$$

$$\hat{\dot{q}}_V(t) = \dot{q}_{V,0} + b_v t \tag{57}$$

with $$b_v = \left[\frac{\tau'_{V,1}}{m_{V,1}}, \ldots, \frac{\tau'_{V,n}}{m_{V,n}}\right]^T.$$

Through back transformation by means of V the following is obtained $$\hat{q}_t = q_0 + \dot{q}_0 t + \tfrac{1}{2} bt^2 \quad (59)$$

$$\dot{\hat{q}}_t = \dot{q}_v + bt \quad (60)$$

with $b = Vb_v$. In order to determine the time when a limiting value is exceeded, $\hat{q}_i(t) = \pm q_{max,i}$ is set, with $i=1, \ldots, n$, and is solved with respect to time.

$$\hat{t}_{1/2,i} = -\frac{\dot{q}_{0,i}}{b_i} \pm \sqrt{\frac{\dot{q}_{0,i}^2}{b_i^2} - 2 \cdot \frac{q_{0.1} + q_{max,i}}{b_i}} \quad (61)$$

$$\hat{t}_{3/4,i} = -\frac{\dot{q}_{0,i}}{b_i} \pm \sqrt{\frac{\dot{q}_{0,i}^2}{b_i^2} - 2 \cdot \frac{q_{0.1} + q_{max,i}}{b_i}} \quad (62)$$

For speeds $\dot{\hat{q}}_i(t) = \pm \dot{q}_{max,i}$, is set, with $i=1, \ldots, n$, so that $$\hat{t}_{5/6,i} = \frac{\pm \dot{q}_{max,i} - \dot{q}_{0,i}}{b_i} \quad (63)$$

is obtained. In the decoupled space, the individual coordinates can come to a standstill at different times. Therefore, up to n time intervals must be taken into consideration in the calculation of (61)-(63). If the coordinates with index i come to a standstill, $\tau'_{V,i} = 0$ is selected at the regulator. In order to determine the time of a breach of limiting values for the next interval—if none has been ascertained beforehand—b, $q_0$, $\dot{q}_0$ must be initialized again, in order to be used in (61)-(63). Limiting values are exceeded if $\hat{t}_{1/2,i}$, $\hat{t}_{3/4,i}$, or $\hat{t}_{5/6,i}$ is less than the final time $\hat{t}_{f,i}$ of the current time period.

Alternatively, breaches of limiting values can be searched for iteratively in the discretized braking trajectory (53)-(54):

$$|\hat{q}_{b,i,j}| \geq q_{max,i} \quad (64)$$

$$|\dot{\hat{q}}_{b,i,j}| \geq \dot{q}_{max,i} \quad (64)$$

with $i=1, \ldots, n$ and $j=1, \ldots, n_b$.

In the following example it is stated how the probability of injury to a human in a collision with the robot manipulator can be determined with the aid of the results and methods from [3]. Let $\hat{t}_{imp}$ be the estimated time of a collision.

The reflected Cartesian mass $\hat{m}_{POI}(\hat{t}_{imp})$ and speed $\dot{\hat{x}}_{POI}(\hat{t}_{imp})$ of the POI in the direction u. can be determined [4]. With the aid of these values and the surface geometry of the POI the maximum permitted, biomechanically safe POI speed in the direction u. can be calculated by evaluating the linear safety curve:

$$\dot{\hat{x}}_{POI,max}(\hat{t}_{imp}) = c_1 \hat{m}_{POI}(\hat{t}_{imp}) + c_2 \quad (22)$$

where $\dot{\hat{x}}_{POI,max}(\hat{t}_{imp})$ is the maximum permitted speed. The parameters $c_1$, $c_2$ result from collision experiments. If the following applies:

$\dot{\hat{x}}_{POI,max}(\hat{t}_{imp}) \geq \dot{\hat{x}}_{POI}(\hat{t}_{imp})$, then the selected injury severity is very probably exceeded.

Two algorithms (algorithm 2 and algorithm 3) for estimation and analysis of the braking trajectory are described below, which build on the decoupling-based regulator (42). Algorithm 2 checks the braking trajectory exclusively with regard to exceeding limiting values, whereas in algorithm 3 the entire discretized braking trajectory is determined and breaches of limiting values and potentially dangerous collisions are examined.

In the algorithm 2, first of all the limits of the available motor torque t' in the joint space are determined. Then joint positions, speeds, and torques are transformed into the decoupled space. After the locally optimal control input and the final braking duration for each modal coordinate have been determined, the braking times are sorted in ascending order s. For $i=1 \ldots n$ intervals the times of possible instances of limiting values being exceeded are calculated for each coordinate with index $j=1 \ldots n$. If a calculated time is less than the end time of the current interval, a limiting value is probably exceeded. If in the respective interval no exceeding of limiting values has been ascertained, the initial values for positions, speeds and torques are initialized again for the next interval.

---

Algorithm 2:

$t_{vio} \leftarrow 0$
{Available torque for brake regulator in the joint space}
$\tau'_{m,i}(q) := -(\tau_{max} + g(q))$
$\tau'_{M,i}(q) := \tau_{max} + g(q)$
{decoupling dynamics}
$[M_V, V]$ = eigenvalue decomposition $(M(q))$
$q_{V,0} = V^T q$
$\dot{q}_{V,0} = V^T \dot{q}$
{decoupling motor torques}
$[\tau'_{V,m}, \tau'_{V,M}]$=Algorithm 1 $(\tau_m(q), \tau_M(q), V)$
{Optimal torque, estimation final time}
for i = 1 to n do $$\tau'_{V,i} = \begin{Bmatrix} \tau'_{V,m,i} & \text{if } \dot{q}_{V,i} \geq 0 \\ \tau'_{V,M,i} & \text{if } \dot{q}_{V,i} < 0 \end{Bmatrix}$$

$$\hat{t}_{f,i} = -m_{V,i} \frac{\dot{q}_{V,0,i}}{\tau'_{V,i}} + t_0$$

end for
{sorting the end times of individual modal coordinates}
$[t_{f,s}, s]$ = sort_ascending $(\hat{t}_f)$
$\{i = 1, \ldots, n \text{ times}\}$
for i = 1 to n do
  $\{j = 1, \ldots, n \text{ coordinates}\}$
  for i = 1 to n do
    {times of exceeding position limiting value}

$$\hat{t}_{1/2,i} = -\frac{\dot{q}_{0,i}}{b_i} \pm \sqrt{\frac{\dot{q}_{0,i}^2}{b_i^2} - 2 \cdot \frac{q_{0,i} + q_{max,i}}{b_i}}$$

$$\hat{t}_{3/4,i} = -\frac{\dot{q}_{0,i}}{b_i} \pm \sqrt{\frac{\dot{q}_{0,i}^2}{b_i^2} - 2 \cdot \frac{q_{0,i} + q_{max,i}}{b_i}}$$

{times of exceeding speed limiting value}

$$\hat{t}_{5/6,i} = \frac{\pm \dot{q}_{max,i} - \dot{q}_{0,i}}{b_i}$$

$\hat{t}_{min,j} = \min (\text{find}(\hat{t}_j > 0)) + \hat{t}_{fs,i}$
if $\hat{t}_{min,j} \leq \hat{t}_{fs,i+1}$ then
  $t_{VIO,j} = t_{min,j}$
end if

Algorithm 2:

end for
{First time of exceeding limiting values}
$t_{vio,min} = (\hat{t}_{vio})$
if $t_{vio,min} > 0$ then
    return
end if
{initialization of initial conditions for new interval}
for k = 1 to n do $$q_{V,0,s_k} = q_{V,0,s_k} + \dot{q}_{V,0,s_k}(\hat{t}_{fs,i+1} - \hat{t}_{fs,i}) + \frac{1}{2}b_{V,s_k}(\hat{t}_{fs,i+1} - \hat{t}_{fs,i})^2$$

$$\dot{q}_{V,0,s_k} = \dot{q}_{V,0,s_k} + b_{V,s_k}(\hat{t}_{fs,i+1} - \hat{t}_{fs,i})$$

end for
$q_0 = Vq_{V,0}$
$\dot{q}_0 = V\dot{q}_{V,0}$
$\tau_{V,sj} = 0$ $$b_V = \left[\frac{\tau'_{V,i}}{m_{V,i}}, \ldots, \frac{\tau'_{V,n}}{m_{V,n}}\right]$$

B = $Vb_V$
end for

In the algorithm 3 the control input and the braking duration of each modal coordinate are determined as in algorithm 2. Then the braking duration and final position $\hat{q}(\hat{t}_f)$ of the entire robot manipulator is determined. After definition of the time vector $t_b$ the modal positions and speeds of the discretized braking trajectory are determined. In each time step it is checked whether limiting values are exceeded and the distance from the person is estimated. In the event of a collision it is analyzed whether this leads to an injury to the person. Finally, the smallest possible distance that occurs between human and robot during the braking trajectory is determined.

Algorithm 3:

injury_position ← false
injury_speed ← false
dangerous_collision ← false
$n_b$ ← number of support points of braking trajectory
{Available torque for brake regulator in the joint space}
$\tau'_{m,i}(q) := -(\tau_{max} + g(q))$
$\tau'_{M,i}(q) := \tau_{max} - g(q)$
{decoupling dynamics}
$[M_V, V]$ = eigenvalue decomposition (M(q))
$\hat{q}_{bV,0} = V^T q$ $\hat{\dot{q}}_{bV,0} = V^T \dot{q}$ {Optimal torque, estimation final time and position}
for i = 1 to n do $$\tau'_{V,i} = \begin{cases} \tau'_{V,m,i} & \text{if } \dot{q}_{V,i} \geq 0 \\ \tau'_{V,M,i} & \text{if } \dot{q}_{V,i} < 0 \end{cases}$$

$$\hat{t}_{f,i} = -m_{V,i}\frac{\dot{q}_{V,0,i}}{\tau'_{V,i}} + t_0$$

$$\hat{q}_{V,i}(\hat{t}_{f,i}) = q_{V,0,i} - \frac{1}{2}\frac{m_{V,i}\dot{q}^2_{bV,0,i}}{\tau'_{V,i}}$$

end for
{braking duration and final position of the entire robot manipulator}

Algorithm 3:

$\hat{t}_f = \max(\hat{t}_{f,i})$, i = 1, . . . , n
$\hat{q}(\hat{t}_f) = V\hat{q}_V(\hat{t}_f)$
{time vector for braking trajectory}
$t_{b,0} = t_0$ $$t_{b,j+1} = t_{b,j} + \frac{t_f}{n-1}, j = 1, \ldots, n_b - 1$$

{calculation and analysis of the braking trajectory}
for j = 1 to $n_b$ do
  for i = 1 to n do
    if $t_{b,j} > t_{f,i}$ then $$\hat{q}_{bV,i,j} = \hat{q}_{V,i}(\hat{t}_{f,i})$$

$$\hat{\dot{q}}_{bV,i,j} = 0$$

else $$\hat{q}_{bV,i,j} = q_{bV,0,i} + \dot{q}_{bV,0,i}t_{b,j} + \frac{1}{2}\frac{\tau'_{V,i}}{m_{V,i}}t_{b,j}$$

$$\hat{\dot{q}}_{bV,i,j} = \dot{q}_{bV,=,i} + \frac{\tau'_{V,i}}{m_{V,i}}t_{b,j}$$

end if
  end for
  {Current position and speed in the joint space}
  $q_{b,j} = V\hat{q}_{bV,j}$ $\hat{\dot{q}}_{b,j} = V\hat{\dot{q}}_{bV,j}$ {check whether position or speed limiting value breached}
  if $|\hat{q}_{b,i,j}| \geq q_{max,i}$ then
    injury_position ← tru
  end if if $|\hat{\dot{q}}_{b,i,j}| \geq \dot{q}_{max,i}$ then injury_speed ← true
  end if
  {current distance from person}
  $d_j = \min\_dist(\hat{x}_{POI,j}, X_h)$
  {checking whether collision exceeds permitted injury severity}
  if $\hat{d}_j \leq 0$ then
    $\hat{x}_{POI,j}$ = reflected_mass($\hat{q}_{b,j}$, M($\hat{q}_{b,j}$), u)

$\hat{\dot{x}}_{POI,j}$ = Cartesian_speed($\hat{q}_{b,j}$, $\hat{\dot{q}}_{b,j}$, u)

$\hat{\dot{x}}_{POI,j,max} = c_1\hat{m}_{POI,j} + c_2$ if $\hat{\dot{x}}_{POI,j} \geq \hat{\dot{x}}_{POI,j,max}$ then dangerous_collision ← true
    end if
  end if
end for
{smallest distance from person during braking operation}
$d_{min} = \min(\hat{d})$ Advantages and preferred embodiment of the device are produced by corresponding and analogous transfer of the statements made above with regard to the proposed method.

FIG. 1 shows a representation of a control range with independent limiting values in the decoupled space by scaling of the original motor torques of a robot manipulator.

In this case the proposed method is actually applied, in order to ensure that a robot manipulator that is in motion is braked in a minimum time into a rest state, i.e. a state without motion. The dynamics of the robot manipulator may be described by the following system of coupled motion equations $BG_G$:

$$\theta = \int \dot{\theta} dt + \theta_0 \quad (37)$$

$$M(q)\ddot{q} = K_J(\theta - q) \quad (38)$$

with $\theta_0 \in R^n$ as the N motor positions at the time of the start of braking.

In general, the system of equations (37)-(38) cannot be solved analytically because of the coupling by means of mass or inertia matrix M(q). A numerical solution of the system of equations (37)-(38) requires too much computing time for a real-time control. On the other hand, the proposed method enables the manipulated variable to be ascertained sufficiently precisely. Moreover, with the proposed method it is possible to determine the braking trajectory of each articulated connection of the robot manipulator and the necessary braking time in real time.

In order to solve the present optimal control problem, the dynamics equation (37)-(38) is initially decoupled by means of eigenvalues. For this purpose, the mass matrix M(q) may be symmetrically and positive definite. Furthermore, the rigidity matrix $K_J$ may be positive definite, so that an orthonormal matrix $V \in R^{n \times n}$ can be found, for which the following applies:

$$MV = KVM_V, \quad (39)$$

wherein $M_Q$ is a diagonal matrix. When new decoupled coordinates $\theta_Q = V^{-1}\theta$ and $q_Q = V^{-1}q$ are used, N independent SISO (single input single output) spring systems are obtained:

$$M_V \ddot{q}_V = \theta_V - q_V. \quad (40)$$

Furthermore, it is significant that the restrictions of the manipulated variables $u_m(t)$ must likewise be transformed into the decoupled system. The restrictions of the manipulated variables $u_m(t)$ here may be given by $u_{m,min}$ and $u_{m,max}$. These restrictions span a manipulated variable space $\Omega$ (hypercube):

$$\Omega := [u_{1,min}, u_{1,max}] \times \ldots \times [u_{m,min}, u_{m,max}] \quad (41)$$

The manipulated variable space $\Omega_Q$ transformed into the decoupled system is then revealed as:

$$\Omega_V = Q^{-1}(\Omega). \quad (42)$$

This transformation is linear. If, for the determinant of the transformation matrix $Q^{-1}$, $\det V^{-1} = 1$ applies, the hypercube is rotated, and for $\det V^{-q} = -1$ the hypercube is reflected.

Furthermore, it is significant that after the transformation of the restrictions $u_{m,min}$ and $u_{m,max}$ into the decoupled system, the values $u_{m,min}$, $u_{m,max}$ set out above are no longer independent of one another. This means that in the decoupled system $BG_E$, the restrictions $u_{m,min}$, $u_{m,max}$ are basically not decoupled. In order nevertheless to enable an analytical solution in the decoupled system, a search is performed for the largest hypercube $\Omega_V'$ in the transformed system which lies completely within the original limits (see equation (41)) of the back-transformed hypercube $\Omega'$. For this hypercube $\Omega_V'$ the manipulated variables $u_m^*(t)$ and the restrictions $u_{m,min}$, $u_{m,max}$ are independent, i.e. decoupled, so that the decoupled motion equations can be solved analytically. After the manipulated variable trajectories $uT_m^*(t)$ and state trajectory $ZT^*(t)$ in the decoupled system have been determined, they are back-transformed into the original coupled system. From the manipulated variable trajectory $uT_m^{**}(t)$ the manipulated variables $u_m(t_{k+1})$ for the next interval k+1 are determined and, furthermore, the manipulated variables $u_m(t_{k+1})$ are used for control or regulation of the motor $MOT_m$.

Figure 2:
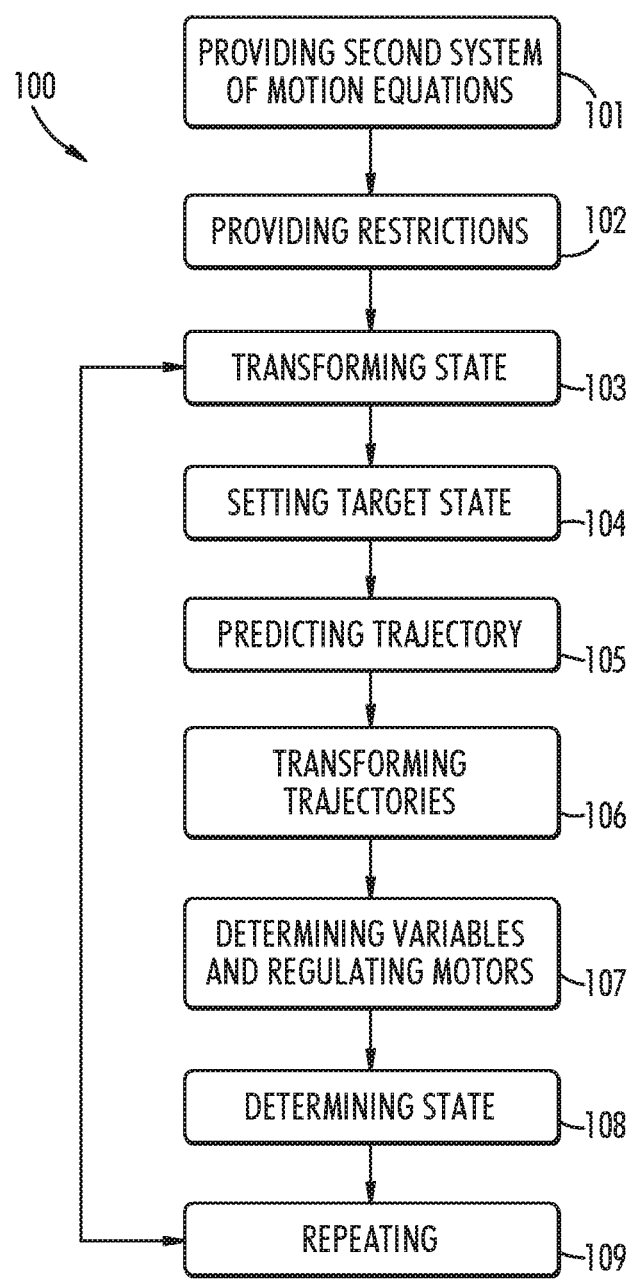
FIG. 2 shows a schematic method sequence of an exemplary embodiment of the proposed method; and, FIG. 3 shows a schematic structure of an exemplary embodiment of a proposed regulating device.

In this connection FIG. 2 shows a schematic sequence for the exemplary embodiment described above of the proposed method for controlling/regulating motors $MOT_m$ of a robot manipulator, with m=1, 2 . . . M, wherein the robot manipulator has robot components that are interconnected via a number N of articulated connections $GEL_n$, with n=1, 2, . . . , N; wherein N=M and n=m, joint angles of the articulated connections $GEL_n$ can be adjusted by means of associated motors $MOT_m$; $Z(t_k) = \{z_p(t_k)\}$ is a state of the robot components in an interval $t_k$, wherein k=0, 1, 2, 3, . . . and p=1, 2, . . . , P; a first system of coupled motion equations $BG_G$ is predetermined and describes rigid-body dynamics or flexible-body dynamics of the connected robot components: in the first system of motion equations $BG_G$ $u_m(t_k)$ is a manipulated variable for the respective motor $MOT_m$, and for the first system of coupled motion equations $BG_G$, restrictions of the manipulated variables $u_m(t_k)$ and restrictions of the states $Z(t_k)$ of the connected robot components are predetermined, with the following steps.

In a step 101, for the first system of coupled motion equations $BG_G$, a second system of locally equivalent decoupled motion equations $BG_E$ is provided that describes the rigid-body dynamics or the flexible-body dynamics of the connected robot components. A step 102 provides restrictions of the manipulated variables $u_m(t_k)$ transformed into the second system and provides restrictions of the states $Z(t_k)$ transformed into the second system. In a step 103 the state $Z(t_k)$ transformed into the second system as $Z^*(t_k)$ is provided. In a step 104, for the second system of decoupled motion equations $BG_E$, setting a target state $SZ^*$ of the robot manipulator which is to be reached starting from the state $Z^*(t_k)$ takes place, and setting one or more conditions $BD^*$ and/or one or more characteristics $KZ^*$ that define how to achieve the target state $SZ^*$ takes place. In a step 105, in the second system of decoupled motion equations $BG_E$ a state trajectory $ZT^*(t)$ and the associated manipulated variable trajectories $uT^*_m(t)$ are predicted depending on the state $Z^*(t_k)$ and the target state $SZ^*$ while meeting the conditions $BD^*$, the characteristics $KZ^*$, the transformed restrictions of the manipulated variables $u_m(t_k)$, and the transformed restrictions of the states $Z(t_k)$ for an interval of $t=t_k$ to $t=t_{k+w}$, wherein $\Delta t = t_{k+w} - t_k$ is a predetermined prediction interval. In a step 106 transforming of the manipulated variable trajectories $uT^*_m(t)$ and the state trajectories $ZT^*(t)$ into the first system of coupled motion equations $BG_G$ takes place to generate manipulated variable trajectories $uT_m^{}(t)$ and state trajectories $ZT^{}(t)$. In a step 107, from the manipulated variable trajectories $uT_m^{}(t)$ determination of manipulated variables $u_m(t_{k+1})$ for the next interval k+1 and regulating of the motors $MOT_m$ by means of the manipulated variables $u_m(t_{k+1})$ takes place. In a step 108, from the state trajectories $ZT^{}(t)$ and/or on the basis of sensor data of a detection system of the state $Z(t)$, determining of the state $Z(t_{k+1})$ takes place for the interval k+1. In a step 109, for $Z(t_k) = Z(t_{k+1})$, the method is performed again, starting with step 103, until a predetermined break-off criterion or the target state $SZ^*$ is reached. The method is advantageously carried out automatically.

Figure 3:
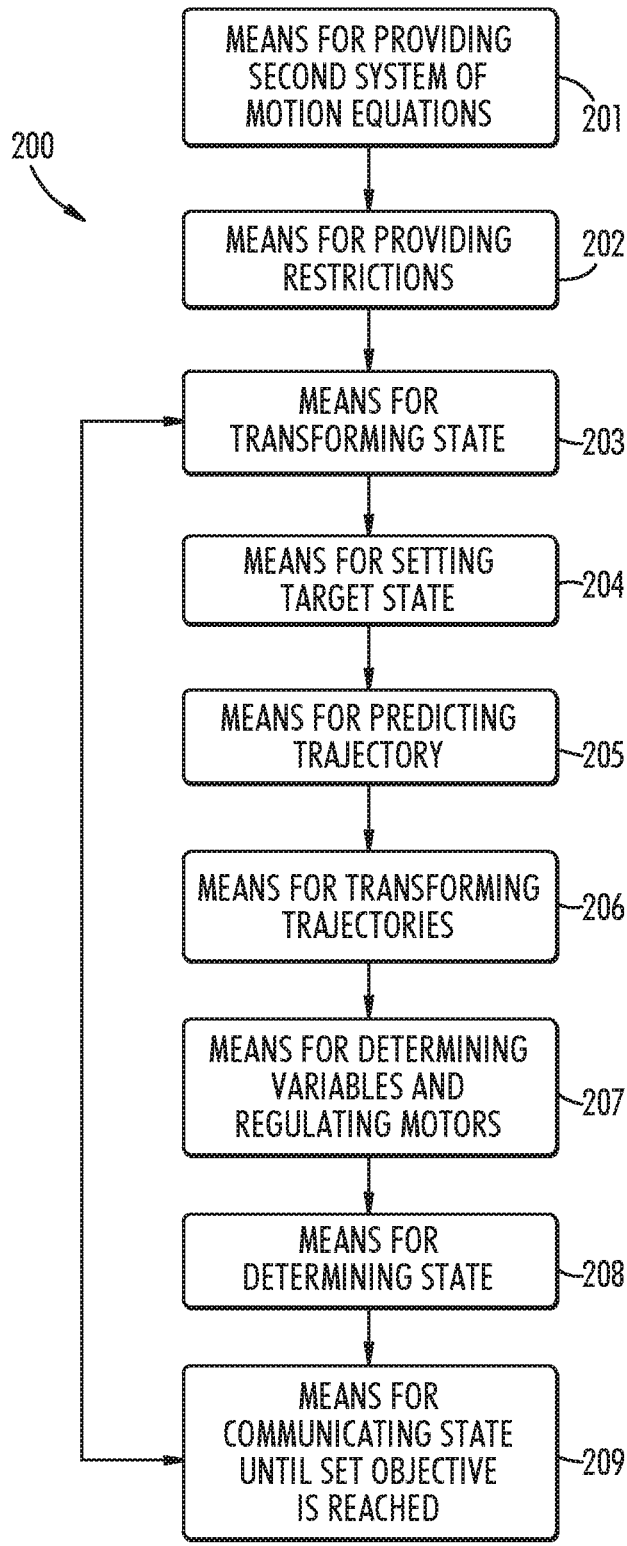

FIG. 3 shows a schematic structure of the exemplary embodiment of the proposed device for controlling/regulating motors $MOT_m$ of a robot manipulator, with m=1, 2 . . . M, wherein the robot manipulator has robot components that are interconnected via a number N of articulated connections $GEL_n$, with n=1, 2, . . . , N and where N=M and n=m; joint angles of the articulated connections $GEL_n$ can be adjusted by means of associated motors $MOT_m$; $Z(t_k) = \{z_p(t_k)\}$ is a state of the robot components in an interval $t_k$, wherein k=0, 1, 2, 3, . . . and p=1, 2, . . . , P; a first system of coupled motion equations $BG_G$ is predetermined and describes rigid-body dynamics or flexible-body dynamics of the connected robot components; in the first system of motion equations $BG_G$ $u_m(t_k)$ is a manipulated variable for the respective motor $MOT_m$; and for the first system of coupled motion equations $BG_G$, restrictions of the manipulated variables $u_m(t_k)$ and restrictions of the states $Z(t_k)$ of the connected robot components are predetermined. The device comprises a means 201 by which, for the first system of coupled motion equations $BG_G$, a second system of locally equivalent decoupled motion equations $BG_E$ is provided that describes the rigid-body dynamics or the flexible-body dynamics of the connected robot components; a means 202 by which restrictions of the manipulated variables $u_m(t_k)$ transformed into the second system and restrictions of the states $Z(t_k)$ transformed into the second system are provided; a means 203 by which the state $Z(t_k)$ transformed into the second system as $Z^*(t_k)$ is provided; a means 204, for the second system of decoupled motion equations $BG_E$, setting of a target state $SZ^*$ of the robot manipulator which is to be reached starting from the state $Z^*(t_k)$ takes place, and setting of one or more conditions $BD^*$ and/or one or more characteristics $KZ^*$ that define how to achieve the target state $SZ^*$ takes place; a means 205 by which, in the second system of decoupled motion equations $BG_E$ a state trajectory $ZT^*(t)$ and the associated manipulated variable trajectories $uT^*_m(t)$ are predicted depending on the state $Z^*(t_k)$ and the target state $SZ^*$ while meeting the conditions $BD^*$, the characteristics $KZ^*$, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval; a means 206 by which transforming of the manipulated variable trajectories $uT^*_m(t)$ and the state trajectories $ZT^*(t)$ into the first system of coupled motion equations $BG_G$ takes place to generate manipulated variable trajectories $uT_m^{}(t)$ and state trajectories $ZT^{}(t)$, a means 207 by which, from the manipulated variable trajectories $uT_m^{}(t)$ manipulated variables $u_m(t_{k+1})$ are determined for the next interval k+1 and the motors $MOT_m$ are regulated by means of the manipulated variables $u_m(t_{k+1})$, a means 208 by which, from the state trajectories $ZT^{}(t)$ and/or on the basis of sensor data of a detection system of the state $Z(t)$, determining of the state $Z(t_{k+1})$ takes place for the interval k+1; and a means 209 which is connected to the means 203 and passes a $Z(t_k)$ to the means 203, for which $Z(t_k)=Z(t_k)$ applies until a predetermined break-off criterion or the target state $SZ/SZ^*$ is reached.

Although the invention has been illustrated and explained in detail by preferred exemplary embodiments, the invention is not restricted by the disclosed examples and other variations can be deduced therefrom by the person skilled in the art without departing from the scope of protection of the invention. It is therefore clear that a number of possible variations exist. It is likewise clear that embodiments referred to by way of example actually only constitute examples that should not be interpreted in any way as a limitation of the scope of protection, the possible applications or the configuration of the invention. In fact the foregoing description and the description of the drawings enable the person skilled in the art to implement the exemplary embodiments specifically, wherein the person skilled in the art with a knowledge of the disclosed idea underlying the invention can make diverse changes with regard to the function or the arrangement of individual elements mentioned in an exemplary embodiment, without departing from the scope of the invention that is defined by the claims and the legally corresponding passages, such as for instance further explanation in the description.

The invention claimed is:

1. A method for controlling and regulating motors $MOT_m$ of a robot, with m=1, 2, . . . M, wherein
   the robot has robot components that are interconnected via a number N of articulated connections $GEL_n$, with n=1, 2, . . . , N;
   joint angles of the articulated connections $GEL_n$ can be adjusted by means of associated motors $MOT_m$;
   $Z(t_k)=\{z_p(t_k)\}$ is a state of the robot components in an interval $t_k$, wherein k=0, 1, 2, 3, . . . and p=1, 2, . . . , P;
   a first system of coupled motion equations $BG_G$ is predetermined and describes rigid-body dynamics or flexible-body dynamics of the connected robot components;
   in the first system of motion equations $BG_G$, $u_m(t_k)$ is a manipulated variable for the respective motor $MOT_m$, and
   for the first system of coupled motion equations $BG_G$, restrictions of the manipulated variables $u_m(t_k)$ and restrictions of the states $Z(t_k)$ of the connected robot components are predetermined, comprising the following steps:
   a) for the first system of coupled motion equations $BG_G$, providing (101) a second system of locally equivalent decoupled motion equations $BG_E$ that describes the rigid-body dynamics or the flexible-body dynamics of the connected robot components;
   b) providing (102) restrictions of the manipulated variables $u_m(t_k)$ transformed into the second system and providing restrictions of the states $Z(t_k)$ transformed into the second system;
   c) providing (103) the state $Z(t_k)$ transformed into the second system as $Z^*(t_k)$;
   d) for the second system of decoupled motion equations $BG_E$, setting (104) a target state $SZ^*$ of the robot manipulator which is to be reached starting from the state $Z^*(t_k)$ takes place, and setting (104) one or more conditions $BD^*$ and/or one or more characteristics $KZ^*$ that define how to achieve the target state $SZ^*$;
   e) in the second system of decoupled motion equations $BG_E$, predicting (105) a state trajectory $ZT^*(t)$ and the associated manipulated variable trajectories $uT^*_m(t)$ depending on the state $Z^*(t_k)$ and the target state $SZ^*$ while meeting the conditions $BD^*$, the characteristics $KZ^*$, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval;
   f) transforming (106) the manipulated variable trajectories $uT^*_m(t)$ and the state trajectories $ZT^*(t)$ into the first system of coupled motion equations $BG_G$ to generate manipulated variable trajectories $uT_m^{}(t)$ and state trajectories $ZT^{}(t)$;
   g) from the manipulated variable trajectories $uT_m^{**}(t)$ determining (107) of manipulated variables $u_m(t_{k+1})$ for the next interval k+1 and regulating the motors $MOT_m$ by means of the manipulated variables $u_m(t_{k+1})$;
   h) from the state trajectories $ZT^{**}(t)$ and/or on the basis of sensor data of a detection system of the state $Z(t)$, determining (108) of the state $Z(t_{k+1})$ takes place for the interval k+1; and
   i) for $Z(t_k)=Z(t_{k+1})$, performing the method again, starting with b) providing (103), until a predetermined break-off criterion or the target state $SZ^*$ is reached.

2. The method for controlling and regulating motors $MOT_m$ of a robot according to claim 1, with m=1, 2, ... M, wherein the robot has robot components that are interconnected via a number N of articulated connections $GEL_n$, with n=1, 2, ..., N;

joint angles of the articulated connections $GEL_n$ can be adjusted by means of associated motors $MOT_m$;

$Z(t_k)=\{z_p(t_k)\}$ is a state of the robot components in an interval $t_k$, wherein k=0, 1, 2, 3, ... and p=1, 2, ..., P;

a first system of coupled motion equations $BG_G$ is predetermined and describes rigid-body dynamics or flexible-body dynamics of the connected robot components;

in the first system of motion equations $BG_G$, $u_m(t_k)$ is a manipulated variable for the respective motor $MOT_m$, and for the first system of coupled motion equations $BG_G$, restrictions of the manipulated variables $u_m(t_k)$ and restrictions of the states $Z(t_k)$ of the connected robot components are predetermined, comprising the following steps:

a) for the first system of coupled motion equations $BG_G$, providing (101) a second system of locally equivalent decoupled motion equations $BG_E$ that describes the rigid-body dynamics or the flexible-body dynamics of the connected robot components, and a regulating and/or control law RG for the manipulated variables $u_m(t_k)$;

b) providing (102) restrictions of the manipulated variables $u_m(t_k)$ transformed into the second system, restrictions of the states $Z(t_k)$ transformed into the second system, and a regulating and/or control law RG transformed into the second system as RG*;

c) providing (103) the state $Z(t_k)$ transformed into the second system as $Z^*(t_k)$;

d) for the second system of decoupled motion equations $BG_E$, setting one or more conditions BD* and/or one or more characteristics KZ* that define the framework in which the regulating and/or control law RG should be applied;

e) in the second system of decoupled motion equations $BG_E$ predicting (105) a state trajectory $ZT^*(t)$ and the associated manipulated variable trajectories $uT^*_m(t)$ are predicted depending on the state $Z^*(t_k)$ and on the basis of the regulating and/or control law RG transformed into the second system while meeting the transformed restrictions of the manipulated variables $u_m(t_k)$, and the transformed restrictions of the states $Z(t_k)$ are predicted with at least an accuracy of <20% for an interval of $t=t_k$ to $t=t_{k+w}$, wherein $\Delta t=t_{k+w}-t_k$, wherein W>k is a predetermined prediction interval;

f) transforming (106) the manipulated variable trajectories $uT^*_m(t)$ and the state trajectories $ZT^*(t)$ into the first system of coupled motion equations $BG_G$ to generate manipulated variable trajectories $uTm^{}(t)$ and state trajectories $ZT^{}(t)$;

g) from the manipulated variable trajectories $uT_m^{**}(t)$ determining (107) manipulated variables $u_m(t_{k+1})$ for the next interval k+1 and regulating the motors $MOT_m$ by means of the manipulated variables $u_m(t_{k+1})$;

h) from the state trajectories $ZT^{**}(t)$ and/or on the basis of sensor data of a detection system of the state $Z(t)$, determining (108) the state $Z(t_{k+1})$ for the interval k+1; and j) for $Z(t_k)=Z(t_{k+1})$, performing the method again, starting with c) providing (103), until a predetermined break-off criterion is reached.

3. The method according to claim 1, wherein: N=M and n=m.

4. The method according to claim 1, wherein the target state SZ and SZ* are predetermined in a time-variable manner: SZ=SZ(t) and SZ*=SZ*(t).

5. The method according to claim 4, wherein the target state SZ(t) and SZ*(t) are determined depending upon obstacles in the surroundings of the robot which are recognized by a surroundings sensor system.

6. The method according to claim 1, wherein a condition BD* is that the target state SZ* is reached in minimal time, and/or that the target state SZ* is reached with a minimal energy requirement of the motors $MOT_m$, and/or that the target state SZ* is reached with a minimal braking distance of the joint angles of the articulated connections $GEL_n$, and/or that the target state SZ* is reached with a minimal braking distance of all the connected robot components.

7. The method according to claim 1, wherein an initial state Z ($t_k$) is a rest state of all robot components, in which a joint angular speed of all articulated connections $GEL_n$ is equal to zero, the target state SZ* is a predetermined motion state of the robot components, and the target state SZ* should be reached in a minimal time.

8. The method according to claim 1, wherein an initial state $Z(t_k)$ is a motion state of the connected robot components, the target state SZ* is a rest state of all robot components in which a joint angular speed of all articulated connections $GEL_n$ is equal to zero, and the target state SZ* should be reached in a minimal time.

9. The method according to claim 1, wherein in the first system of coupled motion equations $BG_G$ a space spanned by motor torques of the motors $MOT_m$ is described by a hypersquare $\Omega$, of which the transformation into the second system of decoupled motion equations $BG_E$ produces a hypersquare, wherein in the second system based upon the hypersquare $\Omega v$ a greatest possible hypersquare $\Omega v'$ is determined, for which it is the case that a back transformation of the hypersquare $\Omega v'$ into the first system is located completely inside the borders of the hypersquare $\Omega$, and wherein the determination of the manipulated variables $u_i^*(t)$ takes place only on the hypersquare $\Omega v'$.

10. A device for controlling and regulating motors $MOT_m$ of a robot, with m=1, 2, ... M, wherein the robot has robot components that are interconnected via a number N of articulated connections $GEL_n$, with n=1, 2, ..., N;

joint angles of the articulated connections $GEL_n$ can be adjusted by means of associated motors $MOT_m$;

$Z(t_k)=\{z_p(t_k)\}$ is a state of the robot components in an interval $t_k$, wherein k=0, 1, 2, 3, ... and p=1, 2, ..., P;

a first system of coupled motion equations $BG_G$ is predetermined and describes a rigid-body system or flexible-body system of the connected robot components, in the first system of motion equations $BG_G$, $u_m(t_k)$ is a manipulated variable for the respective motor $MOT_m$, and for the first system of coupled motion equations $BG_G$, restrictions of the manipulated variables $u_m(t_k)$ and restrictions of the states $Z(t_k)$ of the connected robot components are predetermined, comprising:

a) a means (201) by which, for the first system of coupled motion equations $BG_G$, a second system of locally equivalent decoupled motion equations $BG_E$ is provided that describes the rigid-body dynamics or the flexible-body dynamics of the connected robot components;

b) a means (202) by which restrictions of the manipulated variables $u_m(t_k)$ transformed into the second system and restrictions of the states $Z(t_k)$ transformed into the second system are provided;

c) a means (203) by which the state $Z(t_k)$ transformed into the second system as $Z^*(t_k)$ is provided;

d) a means (204) by which, for the second system of decoupled motion equations $BG_E$, setting of a target state SZ* of the robot manipulator which is to be reached starting from the state $Z^*(t_k)$ takes place, and setting of one or more conditions BD* and/or one or more characteristics KZ* that define how to achieve the target state SZ* takes place;

e) a means (205) by which, in the second system of decoupled motion equations $BG_E$ a state trajectory ZT*(t) and the associated manipulated variable trajectories $uT^*_m(t)$ are predicted depending on the state $Z^*(t_k)$ and the target state SZ* while meeting the conditions BD*, the characteristics KZ*, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval;

f) a means (206) by which transforming of the manipulated variable trajectories $uT^*_m(t)$ and the state trajectories ZT*(t) into the first system of coupled motion equations $BG_G$ takes place to generate manipulated variable trajectories $uT_m^{}(t)$ and state trajectories ZT(t);

g) a means (207) by which, from the manipulated variable trajectories $uT_m^{}(t)$, manipulated variables $u_m(t_{k+1})$ are determined for the next interval k+1 and the motors $MOT_m$ are regulated by means of the manipulated variables $u_m(t_{k+1})$, h) a means (208) by which, from the state trajectories ZT(t) and/or on the basis of sensor data of a detection system of the state Z(t), determining of the state $Z(t_{k+1})$ takes place for the interval k+1; and i) a means (209) which is connected to the means (203) and passes a $Z(t_k)$ to the means (203), for which $Z(t_k)=Z(t_{k+1})$ applies until a predetermined break-off criterion or the target state SZ* is reached.

11. The method according to claim 2, wherein: N=M and n=m.

12. The method according to claim 3, wherein the target state SZ and SZ* are predetermined in a time-variable manner: SZ=SZ(t) and SZ*=SZ*(t).

13. The method according to claim 12, wherein the target state SZ(t) and SZ*(t) are determined depending upon obstacles in the surroundings of the robot which are recognized by a surroundings sensor system.

14. The method according to claim 2, wherein in the first system of coupled motion equations $BG_G$ a space spanned by motor torques of the motors $MOT_m$ is described by a hypersquare $\Omega$, of which the transformation into the second system of decoupled motion equations $BG_E$ produces a hypersquare, wherein in the second system based upon the hypersquare $\Omega v$ a greatest possible hypersquare $\Omega v'$ is determined, for which it is the case that a back transformation of the hypersquare $\Omega v'$ into the first system is located completely inside the borders of the hypersquare $\Omega$, and wherein the determination of the manipulated variables $u_i^*(t)$ takes place only on the hypersquare $\Omega v'$.

15. A device for controlling and regulating motors $MOT_m$ of a robot, with m=1, 2, ... M according to a method of claim 1, wherein the robot has robot components that are interconnected via a number N of articulated connections $GEL_n$, with n=1, 2, ..., N;

joint angles of the articulated connections $GEL_n$ can be adjusted by means of associated motors $MOT_m$;

$Z(t_k)=\{z_p(t_k)\}$ is a state of the robot components in an interval $t_k$, wherein k=0, 1, 2, 3, ... and p=1, 2, ..., P;

a first system of coupled motion equations $BG_G$ is predetermined and describes a rigid-body system or flexible-body system of the connected robot components, in the first system of motion equations $BG_G$, $u_m(t_k)$ is a manipulated variable for the respective motor $MOT_m$, and for the first system of coupled motion equations $BG_G$, restrictions of the manipulated variables $u_m(t_k)$ and restrictions of the states $Z(t_k)$ of the connected robot components are predetermined, comprising:

a) a means (201) by which, for the first system of coupled motion equations $BG_G$, a second system of locally equivalent decoupled motion equations $BG_E$ is provided that describes the rigid-body dynamics or the flexible-body dynamics of the connected robot components;

b) a means (202) by which restrictions of the manipulated variables $u_m(t_k)$ transformed into the second system and restrictions of the states $Z(t_k)$ transformed into the second system are provided;

c) a means (203) by which the state $Z(t_k)$ transformed into the second system as $Z^*(t_k)$ is provided;

d) a means (204) by which, for the second system of decoupled motion equations $BG_E$, setting of a target state SZ* of the robot manipulator which is to be reached starting from the state $Z^*(t_k)$ takes place, and setting of one or more conditions BD* and/or one or more characteristics KZ* that define how to achieve the target state SZ* takes place;

e) a means (205) by which, in the second system of decoupled motion equations $BG_E$ a state trajectory ZT*(t) and the associated manipulated variable trajectories $uT^*_m(t)$ are predicted depending on the state $Z^*(t_k)$ and the target state SZ* while meeting the conditions BD*, the characteristics KZ*, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval;

f) a means (206) by which transforming of the manipulated variable trajectories $uT^*_m(t)$ and the state trajectories ZT*(t) into the first system of coupled motion equations $BG_G$ takes place to generate manipulated variable trajectories $uT_m^{}(t)$ and state trajectories ZT(t);

g) a means (207) by which, from the manipulated variable trajectories $uT_m^{}(t)$, manipulated variables $u_m(t_{k+1})$ are determined for the next interval k+1 and the motors $MOT_m$ are regulated by means of the manipulated variables $u_m(t_{k+1})$, h) a means (208) by which, from the state trajectories ZT(t) and/or on the basis of sensor data of a detection system of the state Z(t), determining of the state $Z(t_{k+1})$ takes place for the interval k+1; and i) a means (209) which is connected to the means (203) and passes a $Z(t_k)$ to the means (203), for which $Z(t_k)=Z(t_{k+1})$ applies until a predetermined break-off criterion or the target state SZ* is reached.

16. A device for controlling and regulating motors $MOT_m$ of a robot, with m=1, 2, . . . M according to a method of claim 3, wherein the robot has robot components that are interconnected via a number N of articulated connections $GEL_n$, with n=1, 2, . . . , N;

joint angles of the articulated connections $GEL_n$ can be adjusted by means of associated motors $MOT_m$;

$Z(t_k)=\{z_p(t_k)\}$ is a state of the robot components in an interval $t_k$, wherein k=0, 1, 2, 3, . . . and p=1, 2, . . . , P;

a first system of coupled motion equations $BG_G$ is predetermined and describes a rigid-body system or flexible-body system of the connected robot components, in the first system of motion equations $BG_G$, $u_m(t_k)$ is a manipulated variable for the respective motor $MOT_m$, and for the first system of coupled motion equations $BG_G$, restrictions of the manipulated variables $u_m(t_k)$ and restrictions of the states $Z(t_k)$ of the connected robot components are predetermined, comprising:

a) a means (201) by which, for the first system of coupled motion equations $BG_G$, a second system of locally equivalent decoupled motion equations $BG_E$ is provided that describes the rigid-body dynamics or the flexible-body dynamics of the connected robot components;

b) a means (202) by which restrictions of the manipulated variables $u_m(t_k)$ transformed into the second system and restrictions of the states $Z(t_k)$ transformed into the second system are provided;

c) a means (203) by which the state $Z(t_k)$ transformed into the second system as $Z^*(t_k)$ is provided;

d) a means (204) by which, for the second system of decoupled motion equations $BG_E$, setting of a target state SZ* of the robot manipulator which is to be reached starting from the state $Z^*(t_k)$ takes place, and setting of one or more conditions BD* and/or one or more characteristics KZ* that define how to achieve the target state SZ* takes place;

e) a means (205) by which, in the second system of decoupled motion equations $BG_E$ a state trajectory ZT*(t) and the associated manipulated variable trajectories $uT^*_m(t)$ are predicted depending on the state $Z^*(t_k)$ and the target state SZ* while meeting the conditions BD*, the characteristics KZ*, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval;

f) a means (206) by which transforming of the manipulated variable trajectories $uT^*_m(t)$ and the state trajectories ZT*(t) into the first system of coupled motion equations $BG_G$ takes place to generate manipulated variable trajectories $uT_m^{}(t)$ and state trajectories $ZT^{}(t)$;

g) a means (207) by which, from the manipulated variable trajectories $uT_m^{}(t)$, manipulated variables $u_m(t_{k+1})$ are determined for the next interval k+1 and the motors $MOT_m$ are regulated by means of the manipulated variables $u_m(t_{k+1})$, h) a means (208) by which, from the state trajectories $ZT^{}(t)$ and/or on the basis of sensor data of a detection system of the state Z(t), determining of the state $Z(t_{k+1})$ takes place for the interval k+1; and i) a means (209) which is connected to the means (203) and passes a $Z(t_k)$ to the means (203), for which $Z(t_k)=Z(t_{k+1})$ applies until a predetermined break-off criterion or the target state SZ* is reached.

17. A device for controlling and regulating motors $MOT_m$ of a robot, with m=1, 2, . . . M according to a method of claim 4, wherein the robot has robot components that are interconnected via a number N of articulated connections $GEL_n$, with n=1, 2, . . . , N;

joint angles of the articulated connections $GEL_n$ can be adjusted by means of associated motors $MOT_m$;

$Z(t_k)=\{z_p(t_k)\}$ is a state of the robot components in an interval $t_k$, wherein k=0, 1, 2, 3, . . . and p=1, 2, . . . , P;

a first system of coupled motion equations $BG_G$ is predetermined and describes a rigid-body system or flexible-body system of the connected robot components, in the first system of motion equations $BG_G$, $u_m(t_k)$ is a manipulated variable for the respective motor $MOT_m$, and for the first system of coupled motion equations $BG_G$, restrictions of the manipulated variables $u_m(t_k)$ and restrictions of the states $Z(t_k)$ of the connected robot components are predetermined, comprising:

a) a means (201) by which, for the first system of coupled motion equations $BG_G$, a second system of locally equivalent decoupled motion equations $BG_E$ is provided that describes the rigid-body dynamics or the flexible-body dynamics of the connected robot components;

b) a means (202) by which restrictions of the manipulated variables $u_m(t_k)$ transformed into the second system and restrictions of the states $Z(t_k)$ transformed into the second system are provided;

c) a means (203) by which the state $Z(t_k)$ transformed into the second system as $Z^*(t_k)$ is provided;

d) a means (204) by which, for the second system of decoupled motion equations $BG_E$, setting of a target state SZ* of the robot manipulator which is to be reached starting from the state $Z^*(t_k)$ takes place, and setting of one or more conditions BD* and/or one or more characteristics KZ* that define how to achieve the target state SZ* takes place;

e) a means (205) by which, in the second system of decoupled motion equations $BG_E$ a state trajectory ZT*(t) and the associated manipulated variable trajectories $uT^*_m(t)$ are predicted depending on the state $Z^*(t_k)$ and the target state SZ* while meeting the conditions BD*, the characteristics KZ*, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval;

f) a means (206) by which transforming of the manipulated variable trajectories $uT^*_m(t)$ and the state trajectories ZT*(t) into the first system of coupled motion equations $BG_G$ takes place to generate manipulated variable trajectories $uT_m^{}(t)$ and state trajectories $ZT^{}(t)$;

g) a means (207) by which, from the manipulated variable trajectories $uT_m^{}(t)$, manipulated variables $u_m(t_{k+1})$ are determined for the next interval k+1 and the motors $MOT_m$ are regulated by means of the manipulated variables $u_m(t_{k+1})$, h) a means (208) by which, from the state trajectories $ZT^{}(t)$ and/or on the basis of sensor data of a detection system of the state $Z(t)$, determining of the state $Z(t_{k+1})$ takes place for the interval k+1; and i) a means (209) which is connected to the means (203) and passes a $Z(t_k)$ to the means (203), for which $Z(t_k)=Z(t_{k+1})$ applies until a predetermined break-off criterion or the target state SZ* is reached.

18. A device for controlling and regulating motors $MOT_m$ of a robot, with m=1, 2, ... M according to a method of claim 5, wherein
    the robot has robot components that are interconnected via a number N of articulated connections $GEL_n$, with n=1, 2, ..., N;
    joint angles of the articulated connections $GEL_n$ can be adjusted by means of associated motors $MOT_m$;
    $Z(t_k)=\{z_p(t_k)\}$ is a state of the robot components in an interval $t_k$, wherein k=0, 1, 2, 3, ... and p=1, 2, ..., P;
    a first system of coupled motion equations $BG_G$ is predetermined and describes a rigid-body system or flexible-body system of the connected robot components,
    in the first system of motion equations $BG_G$, $u_m(t_k)$ is a manipulated variable for the respective motor $MOT_m$, and
    for the first system of coupled motion equations $BG_G$, restrictions of the manipulated variables $u_m(t_k)$ and restrictions of the states $Z(t_k)$ of the connected robot components are predetermined, comprising:
    a) a means (201) by which, for the first system of coupled motion equations $BG_G$, a second system of locally equivalent decoupled motion equations $BG_E$ is provided that describes the rigid-body dynamics or the flexible-body dynamics of the connected robot components;
    b) a means (202) by which restrictions of the manipulated variables $u_m(t_k)$ transformed into the second system and restrictions of the states $Z(t_k)$ transformed into the second system are provided;
    c) a means (203) by which the state $Z(t_k)$ transformed into the second system as $Z^*(t_k)$ is provided;
    d) a means (204) by which, for the second system of decoupled motion equations $BG_E$, setting of a target state SZ* of the robot manipulator which is to be reached starting from the state $Z^*(t_k)$ takes place, and setting of one or more conditions BD* and/or one or more characteristics KZ* that define how to achieve the target state SZ* takes place;
    e) a means (205) by which, in the second system of decoupled motion equations $BG_E$ a state trajectory $ZT^*(t)$ and the associated manipulated variable trajectories $uT^*_m(t)$ are predicted depending on the state $Z^*(t_k)$ and the target state SZ* while meeting the conditions BD*, the characteristics KZ*, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval;
    f) a means (206) by which transforming of the manipulated variable trajectories $uT^*_m(t)$ and the state trajectories $ZT^*(t)$ into the first system of coupled motion equations $BG_G$ takes place to generate manipulated variable trajectories $uT_m^{}(t)$ and state trajectories $ZT^{}(t)$;
    g) a means (207) by which, from the manipulated variable trajectories $uT_m^{**}(t)$, manipulated variables $u_m(t_{k+1})$ are determined for the next interval k+1 and the motors $MOT_m$ are regulated by means of the manipulated variables $u_m(t_{k+1})$,
    h) a means (208) by which, from the state trajectories $ZT^{**}(t)$ and/or on the basis of sensor data of a detection system of the state $Z(t)$, determining of the state $Z(t_{k+1})$ takes place for the interval k+1; and
    i) a means (209) which is connected to the means (203) and passes a $Z(t_k)$ to the means (203), for which $Z(t_k)=Z(t_{k+1})$ applies until a predetermined break-off criterion or the target state SZ* is reached.

19. A device for controlling and regulating motors $MOT_m$ of a robot, with m=1, 2, ... M according to a method of claim 6, wherein
    the robot has robot components that are interconnected via a number N of articulated connections $GEL_n$, with n=1, 2, ..., N;
    joint angles of the articulated connections $GEL_n$ can be adjusted by means of associated motors $MOT_m$;
    $Z(t_k)=\{z_p(t_k)\}$ is a state of the robot components in an interval $t_k$, wherein k=0, 1, 2, 3, ... and p=1, 2, ..., P;
    a first system of coupled motion equations $BG_G$ is predetermined and describes a rigid-body system or flexible-body system of the connected robot components,
    in the first system of motion equations $BG_G$, $u_m(t_k)$ is a manipulated variable for the respective motor $MOT_m$, and
    for the first system of coupled motion equations $BG_G$, restrictions of the manipulated variables $u_m(t_k)$ and restrictions of the states $Z(t_k)$ of the connected robot components are predetermined, comprising:
    a) a means (201) by which, for the first system of coupled motion equations $BG_G$, a second system of locally equivalent decoupled motion equations $BG_E$ is provided that describes the rigid-body dynamics or the flexible-body dynamics of the connected robot components;
    b) a means (202) by which restrictions of the manipulated variables $u_m(t_k)$ transformed into the second system and restrictions of the states $Z(t_k)$ transformed into the second system are provided;
    c) a means (203) by which the state $Z(t_k)$ transformed into the second system as $Z^*(t_k)$ is provided;
    d) a means (204) by which, for the second system of decoupled motion equations $BG_E$, setting of a target state SZ* of the robot manipulator which is to be reached starting fron the state $Z^*(t_k)$ takes place, and setting of one or more conditions BD* and/or one or more characteristics KZ* that define how to achieve the target state SZ* takes place;
    e) a means (205) by which, in the second system of decoupled motion equations $BG_E$ a state trajectory $ZT^*(t)$ and the associated manipulated variable trajectories $uT^*_m(t)$ are predicted depending on the state $Z^*(t_k)$ and the target state SZ* while meeting the conditions BD*, the characteristics KZ*, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval;
    f) a means (206) by which transforming of the manipulated variable trajectories $uT^*_m(t)$ and the state trajectories $ZT^*(t)$ into the first system of coupled motion equations $BG_G$ takes place to generate manipulated variable trajectories $uT_m^{}(t)$ and state trajectories $ZT^{}(t)$;
    g) a means (207) by which, from the manipulated variable trajectories $uT_m^{}(t)$, manipulated variables $u_m(t_{k+1})$ are determined for the next interval k+1 and the motors $MOT_m$ are regulated by means of the manipulated variables $u_m(t_{k+1})$, h) a means (208) by which, from the state trajectories $ZT^{}(t)$ and/or on the basis of sensor data of a detection system of the state $Z(t)$, determining of the state $Z(t_{k+1})$ takes place for the interval k+1; and i) a means (209) which is connected to the means (203) and passes a $Z(t_k)$ to the means (203), for which $Z(t_k)=Z(t_{k+1})$ applies until a predetermined break-off criterion or the target state $SZ^*$ is reached.

20. A device for controlling and regulating motors $MOT_m$ of a robot, with m=1, 2, . . . M according to a method of claim 9, wherein the robot has robot components that are interconnected via a number N of articulated connections $GEL_n$, with n=1, 2, . . . , N;

joint angles of the articulated connections $GEL_n$ can be adjusted by means of associated motors $MOT_m$;

$Z(t_k)=\{z_p(t_k)\}$ is a state of the robot components in an interval $t_k$, wherein k=0, 1, 2, 3, . . . and p=1, 2, . . . , P;

a first system of coupled motion equations $BG_G$ is predetermined and describes a rigid-body system or flexible-body system of the connected robot components, in the first system of motion equations $BG_G$, $u_m(t_k)$ is a manipulated variable for the respective motor $MOT_m$, and for the first system of coupled motion equations $BG_G$, restrictions of the manipulated variables $u_m(t_k)$ and restrictions of the states $Z(t_k)$ of the connected robot components are predetermined, comprising:

a) a means (201) by which, for the first system of coupled motion equations $BG_G$, a second system of locally equivalent decoupled motion equations $BG_E$ is provided that describes the rigid-body dynamics or the flexible-body dynamics of the connected robot components;

b) a means (202) by which restrictions of the manipulated variables $u_m(t_k)$ transformed into the second system and restrictions of the states $Z(t_k)$ transformed into the second system are provided;

c) a means (203) by which the state $Z(t_k)$ transformed into the second system as $Z^*(t_k)$ is provided;

d) a means (204) by which, for the second system of decoupled motion equations $BG_E$, setting of a target state $SZ^*$ of the robot manipulator which is to be reached starting from the state $Z^*(t_k)$ takes place, and setting of one or more conditions $BD^*$ and/or one or more characteristics $KZ^*$ that define how to achieve the target state $SZ^*$ takes place;

e) a means (205) by which, in the second system of decoupled motion equations $BG_E$ a state trajectory $ZT^*(t)$ and the associated manipulated variable trajectories $uT^*_m(t)$ are predicted depending on the state $Z^*(t_k)$ and the target state $SZ^*$ while meeting the conditions $BD^*$, the characteristics $KZ^*$, the transformed restrictions of the manipulated variables $u_m(t_k)$, and the transformed restrictions of the states $Z(t_k)$ for an interval of $t=t_k$ to $t=t_{k+w}$, wherein $\Delta t=t_{k+w}-t_k$ is a predetermined prediction interval;

f) a means (206) by which transforming of the manipulated variable trajectories $uT^*_m(t)$ and the state trajectories $ZT^*(t)$ into the first system of coupled motion equations $BG_G$ takes place to generate manipulated variable trajectories $uT_m^{}(t)$ and state trajectories $ZT^{}(t)$;

g) a means (207) by which, from the manipulated variable trajectories $uT_m^{}(t)$, manipulated variables $u_m(t_{k+1})$ are determined for the next interval k+1 and the motors $MOT_m$ are regulated by means of the manipulated variables $u_m(t_{k+1})$, h) a means (208) by which, from the state trajectories $ZT^{}(t)$ and/or on the basis of sensor data of a detection system of the state $Z(t)$, determining of the state $Z(t_{k+1})$ takes place for the interval k+1; and i) a means (209) which is connected to the means (203) and passes a $Z(t_k)$ to the means (203), for which $Z(t_k)=Z(t_{k+1})$ applies until a predetermined break-off criterion or the target state $SZ^*$ is reached.

\* \* \* \* \*